(12) United States Patent
Hoch et al.

(10) Patent No.: US 12,077,958 B1
(45) Date of Patent: *Sep. 3, 2024

(54) WALL SYSTEM WITH NOVEL STRUCTURES AND METHOD OF CONSTRUCTION THEREOF

(71) Applicant: Diamond Age 3D, Inc., Phoenix, AZ (US)

(72) Inventors: Adam Hoch, San Jose, CA (US); Brian Hillman, Camino, CA (US); Jonathan Reiland, Phoenix, AZ (US); Nicholas Simon, Norco, CA (US); Paul Clark, Gilbert, AZ (US); Philip Mutarelli, Fremont, CA (US); Russell Varone, Phoenix, AZ (US)

(73) Assignee: Diamond Age 3D, Inc., Phoenix, AZ (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/063,421

(22) Filed: Dec. 8, 2022

Related U.S. Application Data

(63) Continuation of application No. 17/326,153, filed on May 20, 2021, now Pat. No. 11,536,019.

(51) Int. Cl.
| | |
|---|---|
| *E04B 1/35* | (2006.01) |
| *E04B 1/16* | (2006.01) |
| *E04B 1/41* | (2006.01) |
| *E04B 1/76* | (2006.01) |

(52) U.S. Cl.
CPC .......... *E04B 1/3505* (2013.01); *E04B 1/16* (2013.01); *E04B 1/4185* (2013.01); *E04B 1/7604* (2013.01)

(58) Field of Classification Search
USPC .............................. 425/59, 60, 63
See application file for complete search history.

(56) References Cited

U.S. PATENT DOCUMENTS

| | | | | |
|---|---|---|---|---|
| 2,442,292 A | * | 5/1948 | Hart ................. | E04G 11/12 |
| | | | | 249/46 |
| 7,641,461 B2 | * | 1/2010 | Khoshnevis ......... | B29C 64/118 |
| | | | | 425/375 |
| 10,486,330 B2 | * | 11/2019 | Giles .................. | B28B 3/20 |

(Continued)

OTHER PUBLICATIONS

International Search Report and Written Opinion for International Application No. PCT/US2022/029997, mailed Aug. 17, 2022, 8 pages.

*Primary Examiner* — Joshua K Ihezie
(74) *Attorney, Agent, or Firm* — Cooley LLP

(57) ABSTRACT

A concrete foundation with reinforcements is formed on a substrate. A first inner wythe horizontal layer and a first outer wythe horizontal layer are printed using a construction material mixture from a 3D printer. The first inner wythe horizontal layer and the first outer wythe horizontal layer are separated by an interstitial space. Additional inner wythe horizontal layers are printed upward on top of the first inner wythe horizontal layer to form a composite inner wythe. Additional outer wythe horizontal layers are printed upward on top of the first outer wythe horizontal layer to form a composite outer wythe. At least one wall tie is placed between the composite inner wythe and the composite outer wythe. A sill cap is installed on top of the composite inner wythe and the composite outer wythe. An anchor mechanism is installed into the sill cap.

19 Claims, 25 Drawing Sheets

(56) References Cited

U.S. PATENT DOCUMENTS

| | | | |
|---|---|---|---|
| 10,688,683 B2* | 6/2020 | Giles | E04G 11/20 |
| 11,286,667 B2* | 3/2022 | Giles | E04C 5/0604 |
| 11,536,019 B2 | 12/2022 | Hoch et al. | |
| 2008/0315065 A1* | 12/2008 | Hanson | E04G 13/00 |
| | | | 249/48 |
| 2012/0038074 A1* | 2/2012 | Khoshnevis | B28B 1/001 |
| | | | 264/34 |
| 2013/0318887 A1* | 12/2013 | Murphy | G08B 13/22 |
| | | | 52/27 |
| 2016/0207220 A1 | 7/2016 | Hack et al. | |
| 2016/0263822 A1 | 9/2016 | Boyd, IV | |
| 2017/0106568 A1* | 4/2017 | Keating | B29C 64/227 |
| 2018/0071949 A1* | 3/2018 | Giles | B28B 1/001 |
| 2019/0277045 A1* | 9/2019 | Hirayama | B33Y 10/00 |
| 2021/0107177 A1* | 4/2021 | Giles | E04B 1/35 |
| 2022/0154486 A1* | 5/2022 | Turnquist | E04G 21/0463 |

* cited by examiner

1900A

1900B

2100A

2100B

2200B

US 12,077,958 B1

WALL SYSTEM WITH NOVEL STRUCTURES AND METHOD OF CONSTRUCTION THEREOF

CROSS-REFERENCE TO RELATED APPLICATIONS

This application is a continuation of U.S. patent application Ser. No. 17/326,153, filed May 20, 2021, now U.S. patent Ser. No. 11/536,019, the contents of which are incorporated herein by reference.

TECHNICAL FIELD

Some embodiments described herein generally relate to building physical walls and steps for constructing such physical walls. More specifically, but not by way of limitation, some embodiments described herein relate to a wall system with novel structures that can be readily utilized in three-dimensional (3D) printer-based construction. Furthermore, some embodiments described herein relate to a method of constructing the wall system with novel structures formed at least in part by an onsite 3D printer apparatus operating at a construction site.

BACKGROUND

In recent years, engineers and architects have experimented with 3D printing techniques to construct various prototypes and commercial versions of buildings and structures. The potential promise of automated construction processes and reduced construction time and human labor, allegedly enabled by the utilization of 3D printers at construction sites, is increasingly touted as the future of cost-effective and expedited homebuilding. Unfortunately, today's known techniques of 3D printing for houses and other buildings exhibit significant disadvantages in real-life construction processes that discourage a widespread adoption of 3D printers in construction industry.

In particular, known 3D printers that are currently utilized in construction typically require a sand-based slurry of grouts and mortar as a feedstock construction material, which is dispensed by a 3D printer nozzle using a slurry pump (e.g. centrifugal pumps, etc.). This sand-based slurry of grouts and mortar incorporates smaller and finer aggregates (i.e. soft mortars) than typical aggregates (i.e. ⅜-inch sieve or larger) in a real concrete mixture used in traditional construction projects. Because the sand-based slurry utilized in the known versions of construction 3D printers is quite thin with a lower viscosity than typical concrete mixtures utilized in manual human labor-based construction, known methods of 3D printing of walls require continuously-flowing extrusions in a short period and rely on chemical bonding between each printed layer for structural rigidity. The lower viscosity of the sand-based slurry material often results in "bulging" of each layer while printing a wall, which may be aesthetically or functionally undesirable in certain construction projects.

Therefore, a need exists for a 3D printer-printable wall system with novel structures and a method of constructing a 3D printer-printable wall system with novel structures that overcomes many of the disadvantages of known 3D printer-based wall construction techniques that utilize a sand-based soft slurry.

SUMMARY

In some embodiments, a method for constructing a three-dimensional (3D) printer-printable wall system includes forming a concrete foundation on a substrate, wherein the concrete foundation embeds horizontal and vertical reinforcements. The method includes printing a first inner wythe horizontal layer and a first outer wythe horizontal layer using a concrete mixture from a 3D printer. The first inner wythe horizontal layer and the first outer wythe horizontal layer are separated by an interstitial space. The method includes placing a first wall dam between the first inner wythe horizontal layer and the first outer wythe horizontal layer in the interstitial space. The method includes printing additional inner wythe horizontal layers upward on top of the first inner wythe horizontal layer to form a composite inner wythe. includes printing additional outer wythe horizontal layers upward on top of the first outer wythe horizontal layer to form a composite outer wythe. The method includes placing at least one additional wall dam on every horizontal layer, while placing a wall tie and an attachment bracket for utility lines only on pre-defined intervals of horizontal layers of the composite inner wythe and the composite outer wythe, which are separated by the interstitial space. The method includes installing a sill cap on top of the composite inner wythe and the composite outer wythe, wherein the sill cap comprises a first curb to encapsulate a top portion of the composite inner wythe, a second curb to encapsulate a top portion of the composite outer wythe, and a central trough positioned between the first curb and the second curb. The method includes inserting an anchor mechanism into the sill cap.

DETAILED DESCRIPTION

Figure 1:
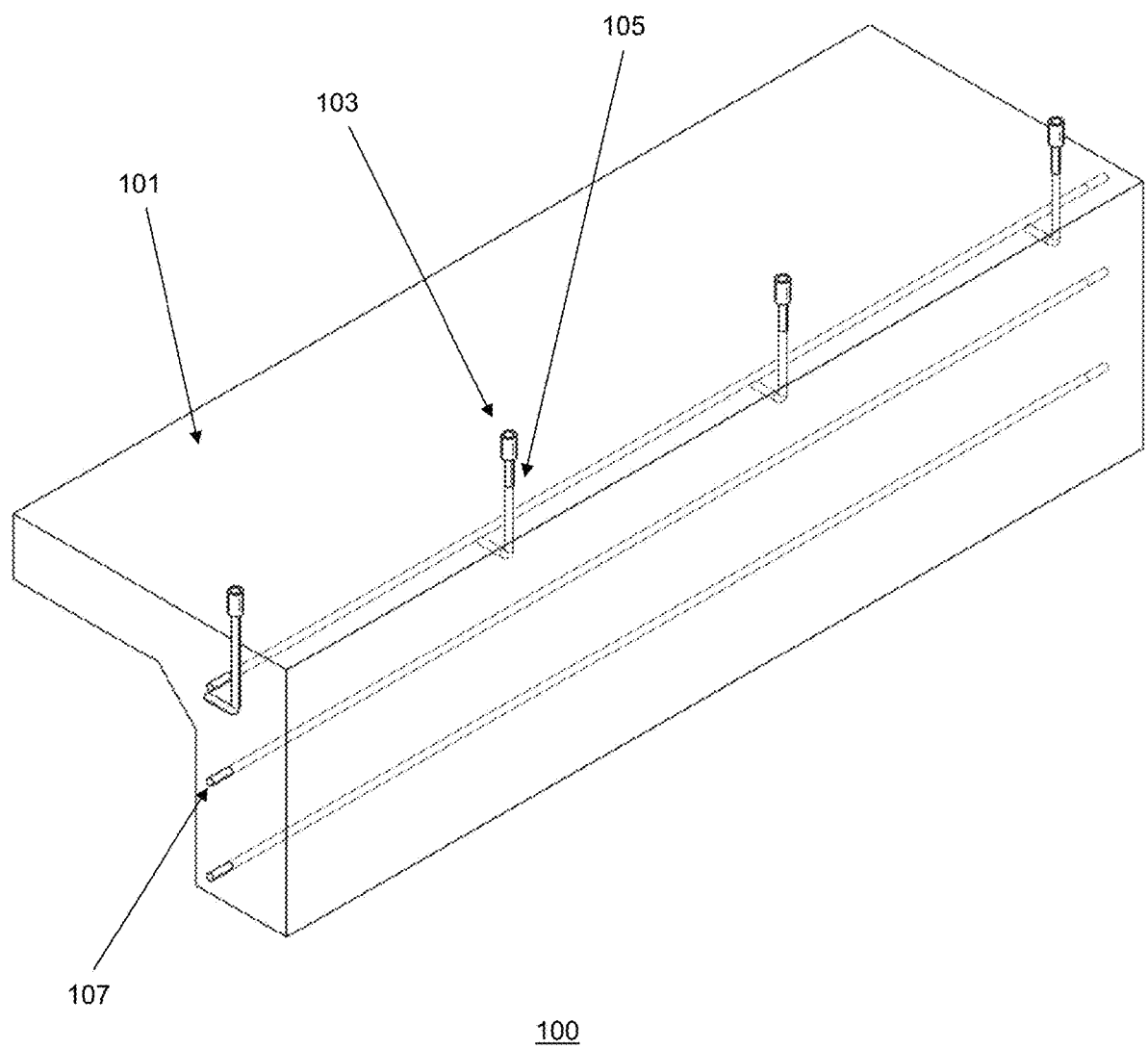
FIG. 1 shows a first step of constructing a three-dimensional (3D) printer-printable wall system, wherein a monolithic foundation is formed (e.g., poured or injected) with rebars and configured with foundation anchors before adding novel structures in subsequent construction steps, in some embodiments.

Known three-dimensional (3D) printers that are currently utilized in construction typically require a sand-based slurry of grouts and mortar as a feedstock construction material. In addition to the lower viscosity of the sand-based slurry material which often results in the aesthetically or functionally undesirable "bulging" of each layer while printing a wall, the reliance on the chemical bonding of layers means that there are significant layering timing risks in the known 3D printing techniques. For example, if multiple layers are dispensed too rapidly, the lower layers may not have cured sufficiently to support the weight of upper layers, thus causing slump, settling, or even collapse. If the multiple layers are dispensed too slowly instead, they may not adhere to each other correctly, which in turn causes cold joints. Moreover, the lower viscosity of the sand-based slurry utilized in a conventional 3D printer for construction limits the window of time available between layered applications for any ad hoc design customizations or changes between printed layers, thus reducing flexibility and improvisation capabilities during construction.

Furthermore, the lower viscosity of the sand-based slurry and the continuously-flowing extrusion from a nozzle orthogonal to the direction of each printed layer in conventional 3D-printed construction techniques often result in imprecise start-and-stop power characteristics of slurry dispensing, which in turn make exact-length segment extrusion and clean edges and sides difficult to achieve during a conventional 3D printer construction process. The extrudate turning 90-degrees at the nozzle outlet often creates unintended turbulent flow and tearing, which induce layering inconsistences and even structural stresses.

Embodiments described herein include a 3D printer-printable wall system with novel structures optimized for using a thicker and stiffer concrete mixture as a feedstock material during a 3D printing of a physical wall, which overcomes many of the disadvantages of known 3D-printed walls.

Embodiments described herein include a 3D printer-printable wall system with novel structures that support advantageous and unique characteristics for a 3D-printed physical wall, such as exact-length segment extrusions, precise shear-cutting of segments, interlocking extrusion pattern weaving, convenient secondary system installations in a uniquely-created interstitial wall cavity, and high thermal and acoustic isolations.

Embodiments described herein include a 3D printer-printable wall system with novel structures that accommodate an unlimited breaktime availability between layer applications during a 3D-printing of a physical wall.

Embodiments described herein include a method of constructing a 3D printer-printable wall system with novel structures that overcomes many of the disadvantages of existing 3D printer-based wall construction techniques that utilize a sand-based soft slurry.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble a three-dimensional (3D) printer-printable wall system with novel structures and a method of constructing the wall system. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order nor imply any limitations in the invention.

A term referred to as "wythe" is defined as a vertical panel of a composite wall. A term referred to as "wall system" is defined as a novel multi-wythe composite wall that incorporates various novel structural components. In some embodiments, the wall system comprises an inner wythe and an outer wythe that are printed directly on a construction site through pressurized ram extrusion from a novel 3D printer apparatus, which is designed specifically to extrude thick and large-aggregate (e.g. ⅜ inches or above) concrete mixtures under high pressures, unlike conventional 3D printers currently used in the construction industry that merely pump and dispense soft mortar-based slurry as building layers.

In some embodiments, each wythe in the novel wall system is a vertical stack of concrete layers extruded from the novel 3D printer apparatus. In some implementations, each concrete layer in a wythe does not require chemical bonds to be held together with adjacent concrete layers, and is instead held together by weight, friction, and tensile forces provided by novel tensioning tendons within the wall system structure. Moreover, the 3D printer-based stacking of the inner wythe and the outer wythe provides an initially-hollow interstitial space between the two wythes of the novel wall system for convenient and mostly machine-automated installation of various novel components (e.g. wall dams, wall ties, attachment brackets for utility lines, etc.) in the interstitial space during the construction process. In most embodiments, the remaining interstitial space of the two wythes after various component installations is subsequently filled with insulation foams and/or cast-in-place concrete for windows or door formations.

One aspect of an embodiment is providing a 3D printer-printable composite wall system that incorporates novel structures optimized for a thicker and stiffer concrete mixture layering via pressurized ram extrusions.

Another aspect of an embodiment is providing a 3D printer-printable composite wall system that behaves like a dry-stacked masonry structure for improved aesthetics and functionality between layers and edges, compared to existing 3D-printing construction methods.

Yet another aspect of an embodiment is providing a 3D printer-printable composite wall system with novel structures that support advantageous and unique characteristics for a 3D-printed physical wall, such as exact-length segment extrusions, precise shear-cutting of segments, interlocking extrusion pattern weaving, convenient secondary system installations in a uniquely-created interstitial wall cavity, and high thermal and acoustic isolations.

Yet another aspect of an embodiment is providing a 3D printer-printable composite wall system with novel structures that accommodate an unlimited breaktime availability between layer applications during a 3D-printing of a physical wall.

Yet another aspect of an embodiment is providing a method of constructing a 3D printer-printable wall system with novel structures that overcomes many of the disadvantages of existing 3D printer-based wall construction techniques that utilize a sand-based soft slurry.

FIG. 1 shows a first step (100) of constructing a three-dimensional (3D) printer-printable wall system, before adding novel structures in subsequent construction steps, in some embodiments. As shown in this perspective view of the first step (100), a monolithic foundation (101), which can be made of concrete, is formed (e.g., by pouring or injecting) with one or more rebars (107) (or horizontal reinforcements) and one or more foundation anchors (105) (or vertical reinforcements) embedded in the foundation structure.

In some embodiments, each rebar (107) can be embedded horizontally from one edge to another edge in the monolithic foundation (101) to strengthen the foundation's structural rigidity, once the poured concrete is hardened. Furthermore, as illustrated in FIG. 1, each foundation anchor (105) incorporates an attachment point (103), which is oriented vertically upright to enable tightening of multiple layers of the wall system by attaching to a tension tendon in the interstitial space of two wythes, in subsequent construction steps (i.e. FIG. 12).

Figure 2:
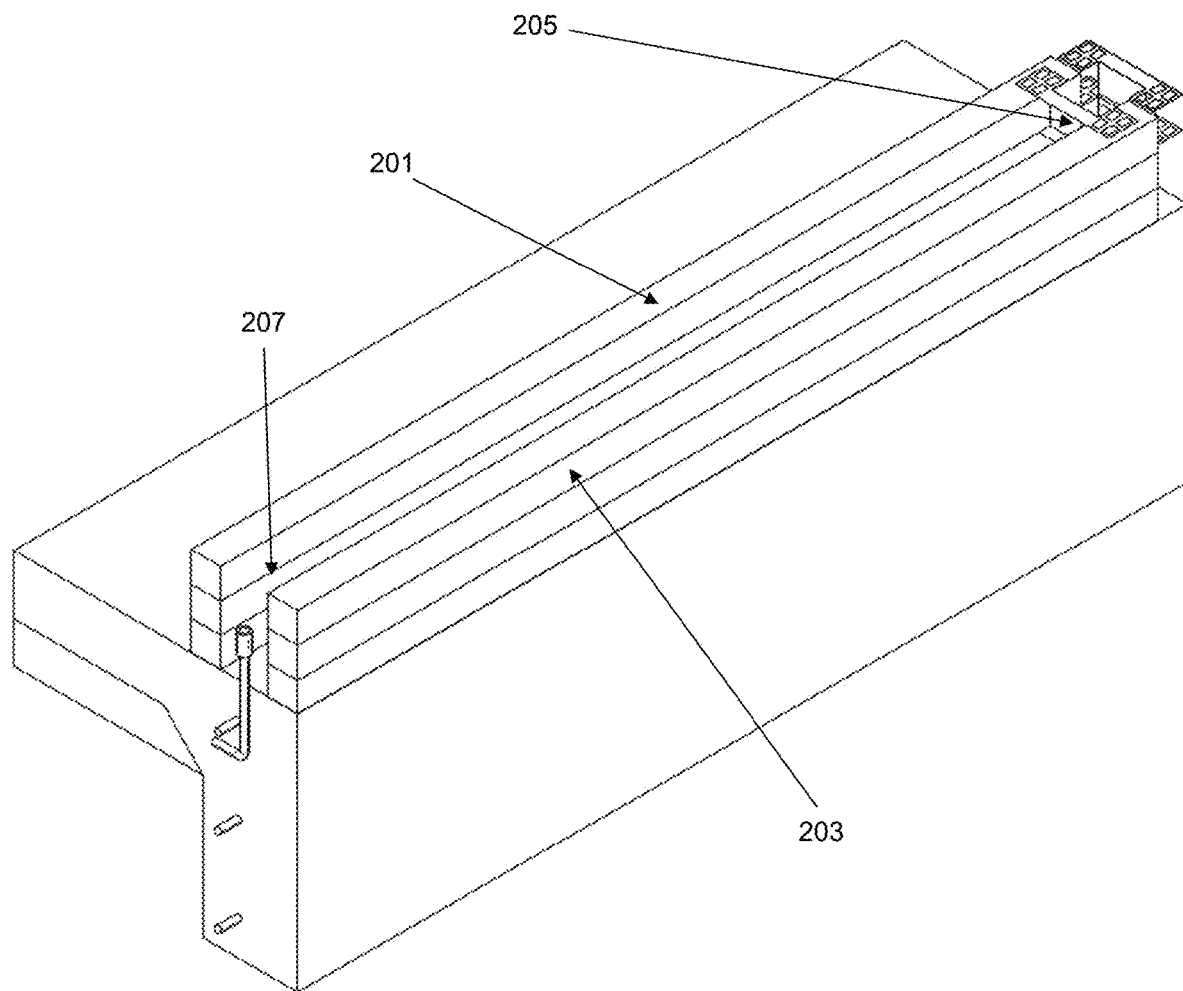
FIG. 2 shows a second step of constructing the wall system, which incorporates multiple inner wythe and outer wythe layers printed by a 3D printer, wherein a wall dam is placed by an automated secondary gantry in each layer, in some embodiments.

FIG. 2 shows a second step (200) of constructing the wall system, which incorporates multiple inner wythe and outer wythe layers printed by a 3D printer, wherein a wall dam (i.e. also called a "wall form" interchangeably in some instances) is placed by an automated secondary gantry in each layer, in some embodiments. FIG. 2 in particular reveals a construction process snapshot with initial three horizontal layers printed by the 3D printer. In some embodiments, the wall system comprises an inner wythe (201) (or a composite inner wythe) and an outer wythe (203) (or a composite outer wythe) separated by an interstitial space (207). As illustrated in FIG. 2, each wythe is a vertical stack of horizontal layers, wherein each horizontal layer is made of a large-aggregate, thick, and stiff concrete mixture extruded from a special purpose-built 3D printer that performs pressurized ram extrusions, unlike conventional 3D printers currently used in construction.

Importantly, the inner wythe (201) and the outer wythe (203) of the wall system behave like a dry-stacked masonry structure, which in turn improves aesthetics, functionality, and architectural design flexibility between layers and edges, compared to known 3D-printing construction methods. In some implementations, the horizontal layers in the inner wythe (201) and the outer wythe (203) do not rely on chemical bonds among adjacent layers to constitute a wall. Instead, in these implementations, the horizontal layers are held in place through weight, friction, and tensile forces provided by a plurality of tension tendons (e.g. 1201 in FIG. 2), which are installed at a later step of the wall system construction.

In some embodiments, the special purpose-built 3D printer is an automated concrete extruder configured to print the inner wythe (201) and the outer wythe (203), one horizontal layer at a time. The horizontal layers for each wythe are effectively vertically stacked upward, as the next horizontal layer printed is positioned immediately above the previously-printed horizontal layer, until each wythe reaches a desired height as a vertical stack of horizontal layers. In some implementations, the desired height of the wall system and the overall architectural details of the wall, such as coordinates for planned installations of windows and/or doors, are pre-programmed into a computer system controlling the special purpose-built 3D printer, before the 3D printing project is initiated at a construction site. Depending on particular needs of the project, in some implementations, horizontal layers can be discontinuous, and the length of each horizontal layer can be adjusted in accordance with construction design specifications. In some embodiments, one or more wall dams (e.g. 205 on the third layer in FIG. 2) are placed by the automated secondary gantry in each horizontal layer in pre-programmed locations, wherein each wall dam enables containment of poured concrete or insulation foams at subsequent construction steps.

Furthermore, in some embodiments, the special purpose-built 3D printer executing pressurized ram extrusions to place each horizontal layer extrudes the large-aggregate, thick, and stiff concrete mixture from a horizontal nozzle oriented in parallel to the direction of the extrusion, which in turn enables a precise stop-and-start power for horizontal layering of the inner wythe (201) or the outer wythe (203). The pressurized ram extrusion of the large-aggregate, thick, and stiff concrete mixture parallel to the path of the nozzle's motion also enables an increased anisotropic strength of the concrete mixture.

The precise stop-and-start power during printing of each wythe, in some embodiments, provides substantial advantages, such as exact-length segment extrusions, precise shear-cutting of segments, and interlocking extrusion pattern weaving, over conventional 3D printing methods that dispense continuously-flowing soft mortar-based material from a conventional 3D printer nozzle oriented perpendicular (i.e. instead of being parallel) to the direction of printed layers. The orthogonality of the printer nozzle relative to the direction of printed layers in conventional 3D printer-based construction often results in imprecise start-and-stop power characteristics for slurry dispensing, which in turn make exact-length segment extrusion and clean edges and sides difficult to achieve.

Continuing with the embodiment as shown in FIG. 2, the interstitial space (207) formed between the inner wythe (201) and the outer wythe (203) contains only minimal obstructions (e.g. wall dams, wall ties, etc.) inside, thus enabling the wall system to embed utility lines, insulation foams, cast-in-place (CIP) lintels, and any other desired elements during the 3D printer-based construction process. The interstitial space (207) also effectively makes the wall system a composite wall comprising isolated wall panels with minimal thermal and structural connection points, which result in a rigid structure with a high level of thermal isolation between the inner wythe (201) and the outer wythe (203). Moreover, the wall system created, in some implementations, has fewer steps to produce a composite wall, with structural adaptability for various spacing arrangements. In particular, the wall system does not require a bond layer or a collar joint to achieve the performance advantages of composite walls.

Figure 3:
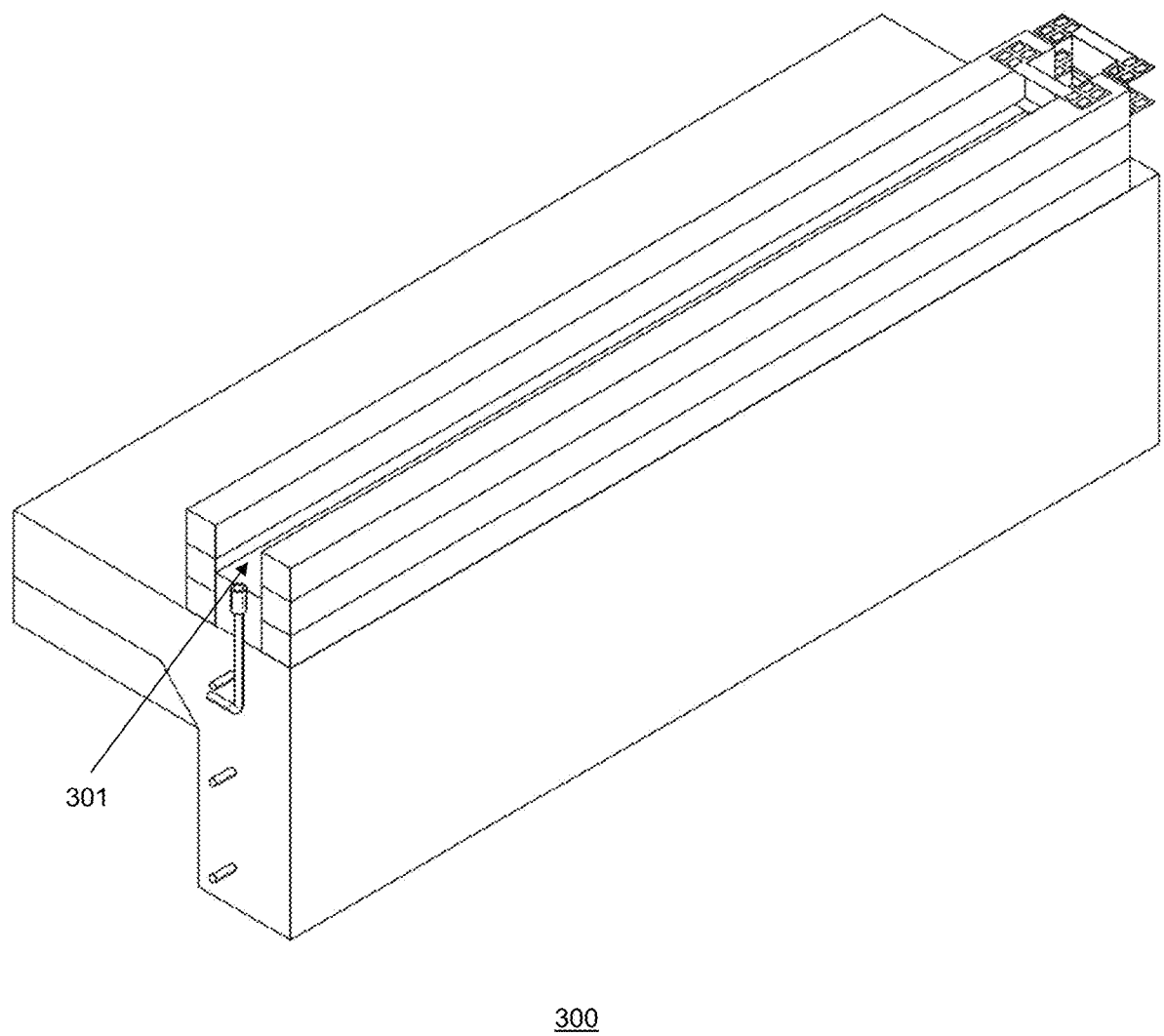
FIG. 3 shows a third step of constructing the wall system, wherein a fixity fill layer is formed in a bottom surface of an inner wythe and an outer wythe, in some embodiments.

FIG. 3 shows a third step (300) of constructing the wall system, wherein a fixity fill layer (301) is poured into a bottom surface of the inner wythe (i.e. 201 in FIG. 2) and the outer wythe (i.e. 203 in FIG. 2), in some embodiments. The fixity fill layer (301) is configured to fill the bottom portion of the interstitial space (i.e. 207 in FIG. 2) between the two wythes to provide a rigid base for the composite wall structure of the wall system, and, in some implementations, has a height equal to a few stacks of bottom horizontal layers in the wall system.

In most cases, one or more attachment points (e.g. 103 in FIG. 1) of the foundation anchor (i.e. 105 in FIG. 1) can stay above the top surface of the fixity fill layer (301) to enable installation of tension tendons in subsequent construction steps. In some embodiments, the automated secondary gantry pours concrete to the bottom of the interstitial space to form the fixity fill layer (301), which functions as a wall fixity. In some embodiments, a human construction can manually pour concrete to the bottom of the interstitial space, even as horizontal layer printing is performed by the special purpose-built 3D printer.

Figure 4:
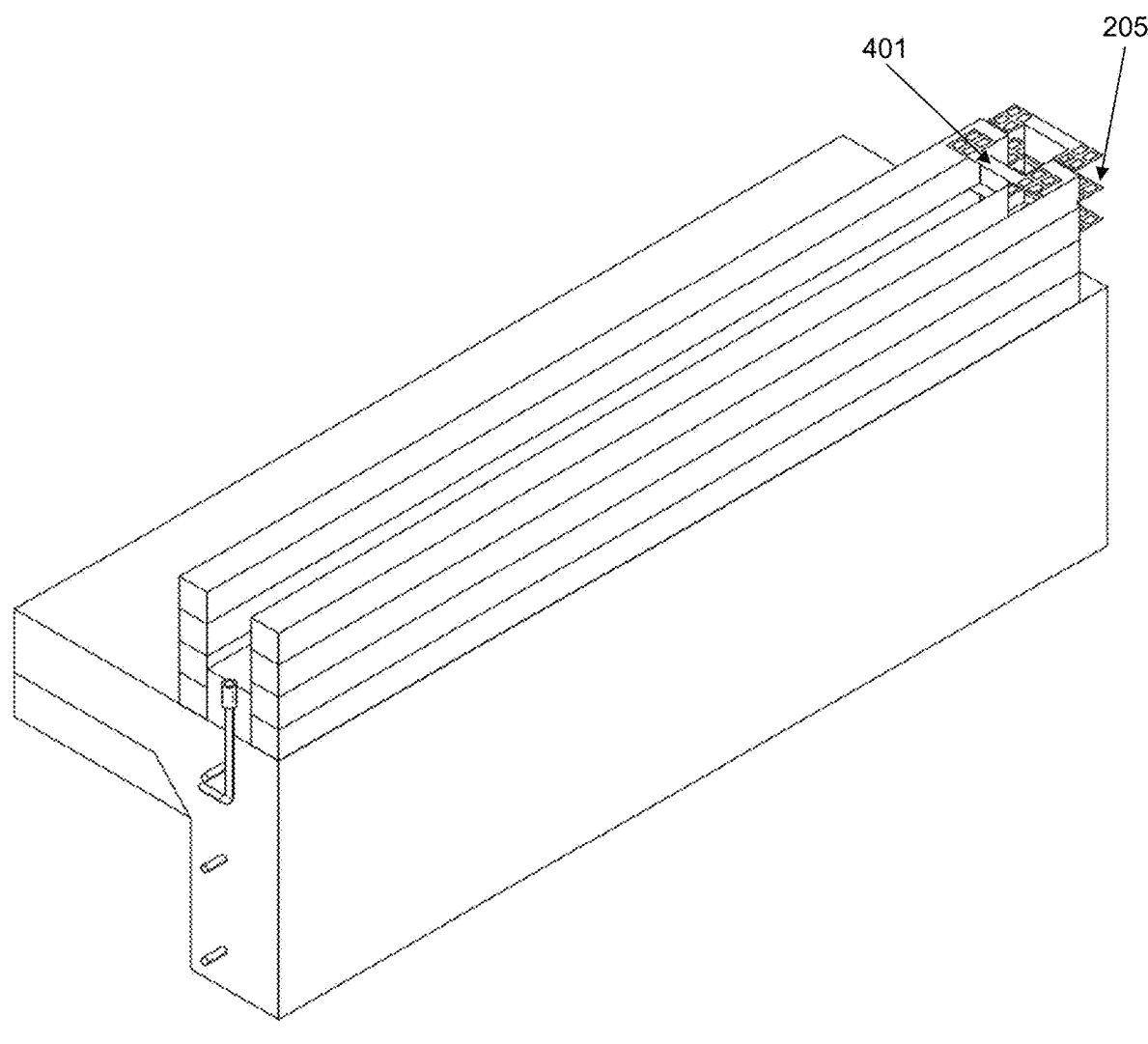
FIG. 4 shows a fourth step of constructing the wall system, wherein the 3D printer prints additional inner wythe and outer wythe layers while the automated secondary gantry places a wall dam in each layer, in some embodiments.

FIG. 4 shows a fourth step (400) of constructing the wall system, wherein the 3D printer prints additional inner wythe and outer wythe layers while the automated secondary gantry places a wall dam in each layer, in some embodiments. FIG. 4 in particular illustrates a construction process snapshot with a third horizontal layer wall dam (205) and a fourth horizontal layer wall dam (401), each of which functioning as a containment dam for poured concrete, insulation foams, or other materials in subsequent construction steps.

In some embodiments, at least one wall dam is placed in every horizontal layer between the two wythes in the interstitial space (i.e. 207 in FIG. 2). The special purpose-built 3D printer operates as an automated concrete extruder to print multiple horizontal layers upward, thus forming a vertical inner stack and a vertical outer stack as inner and outer wythes. In most cases, the wall dams (e.g. 205, 401) in each horizontal layer are placed by the automated secondary gantry. In other cases, the wall dams may be installed by a human construction crew instead.

Figure 5:
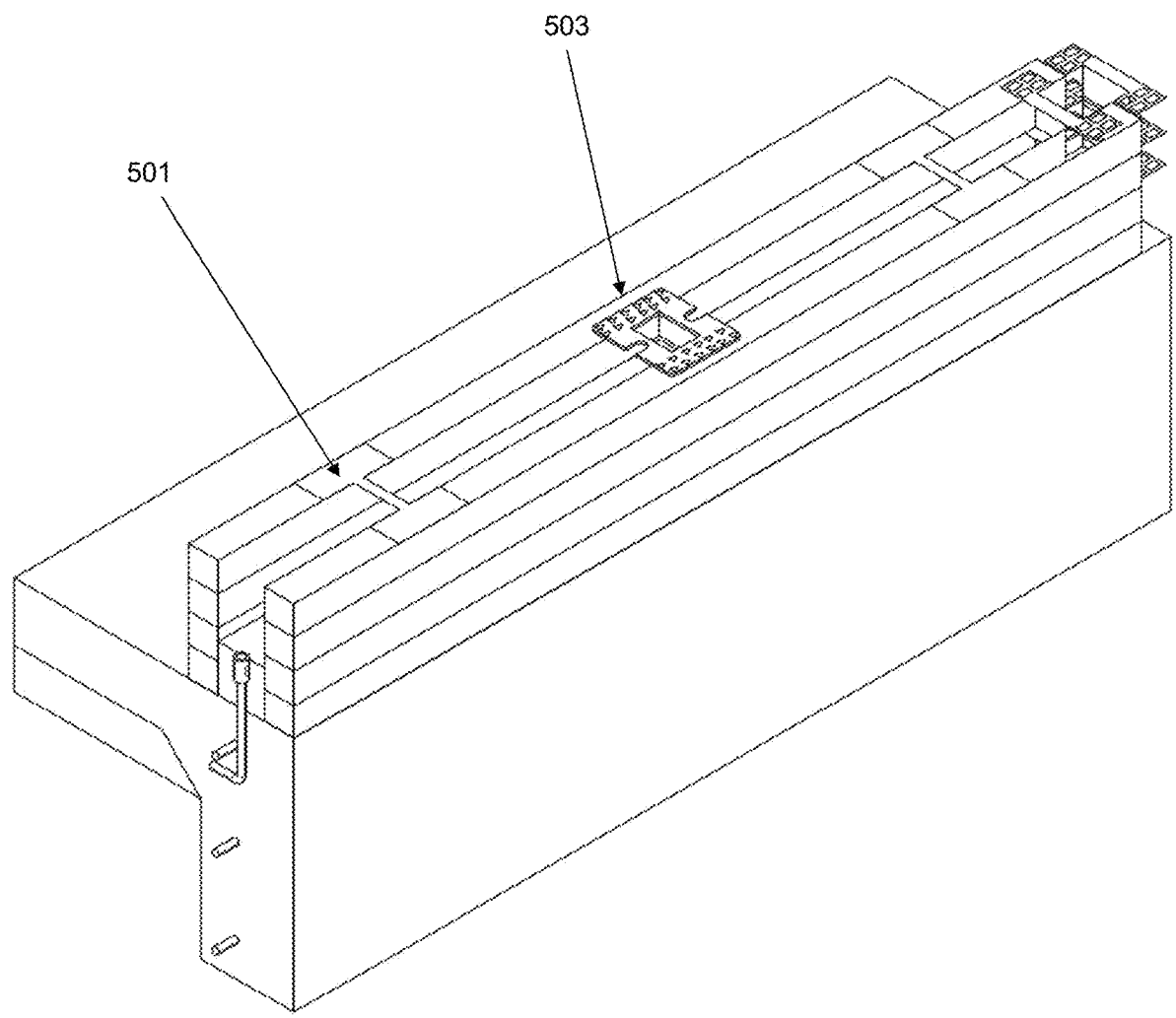
FIG. 5 shows a fifth step of constructing the wall system, wherein the automated secondary gantry places wall ties and attachment brackets on top of an n-th layer print, in some embodiments.

FIG. 5 shows a fifth step (500) of constructing the wall system, wherein the automated secondary gantry places wall ties and attachment brackets on top of an n-th layer print, in some embodiments. At this stage of construction, a wall tie (501) and an attachment bracket (503) for utility lines or equipment are placed by the automated secondary gantry at certain pre-programmed layer intervals (i.e. n-th layers) as horizontal layers for the two wythes are vertically stacking upwards.

For instance, the automated secondary gantry may be configured by a gantry control software to place the wall tie (501) and the attachment bracket (503) for utility lines or equipment at every fourth horizontal layer in the interstitial space between the two wythes. In this case, the automated secondary gantry can place the wall ties and the attachment brackets at horizontal layers that are in integer multiples of four (i.e. $4^{th}$, $8^{th}$, $12^{th}$, $16^{th}$, ..., $4 \times n^{th}$). In another example, the wall ties and the attachment brackets may be installed in smaller or larger intervals.

In some embodiments, the wall tie (501) connects the inner and the outer wythes while maintaining the interstitial space, and also provides a strong structural rigidity for the composite wall structure. Furthermore, as shown in FIG. 5, the attachment bracket (503) for utility lines or equipment is placed horizontally between the two wythes in the interstitial space as an anchorage or a housing for electrical cables, water pipes, heating/ventilation/air conditioning (HVAC) components, or other utility-related items. The attachment bracket (503) may also function as a machine-recognized locator for utility installations in the interstitial space. Moreover, in some implementations, some attachment brackets may also serve a dual purpose of being a wall tie as well as a utility anchorage. In such implementations, the dual-purpose attachment brackets are configured to contribute to the increased structural rigidity of the wall system by providing transference of out-of-plane forces between the inner and the outer wythes.

Figure 6:
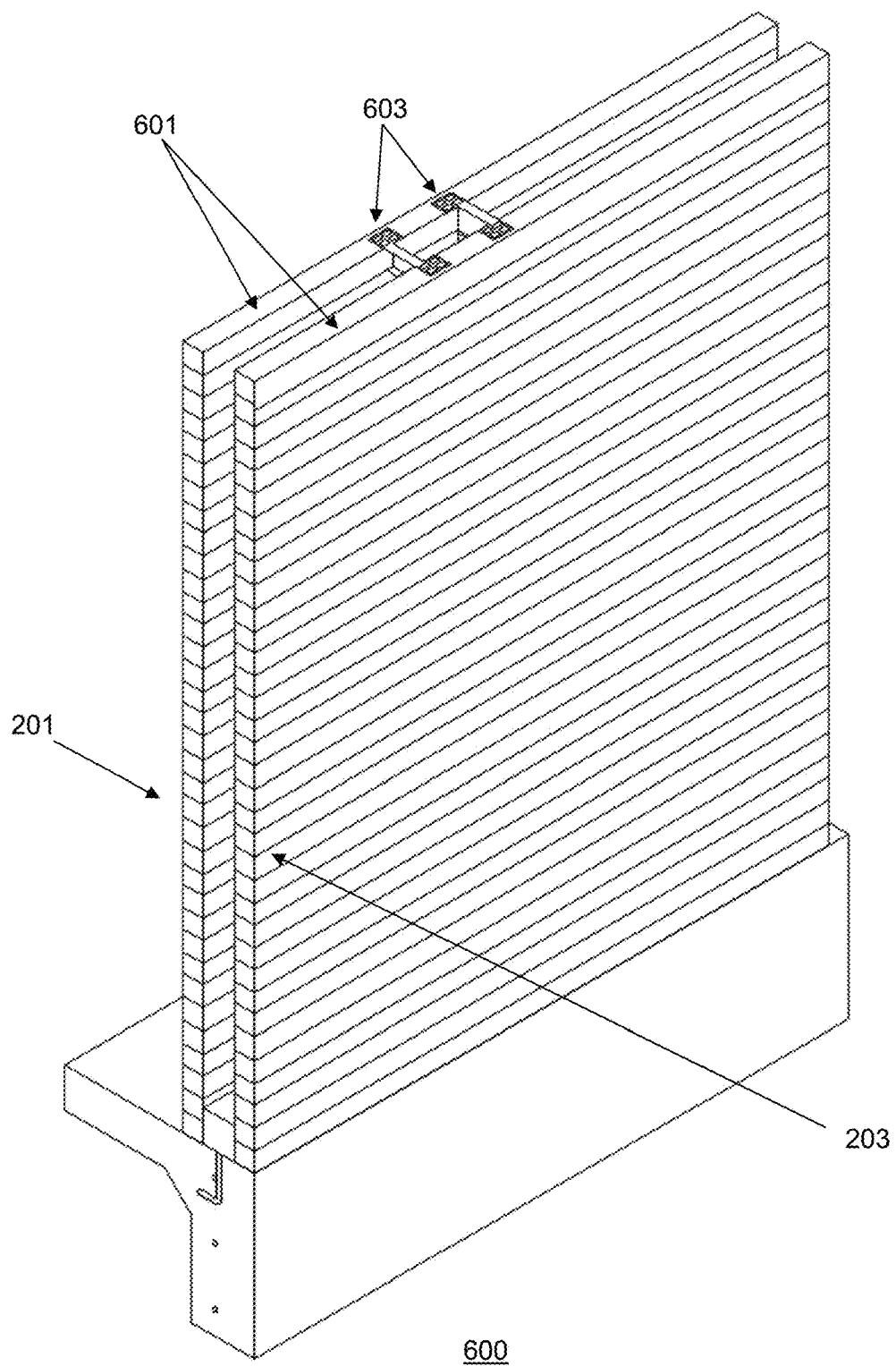
FIG. 6 shows a sixth step of constructing the wall system, wherein the 3D printer prints additional inner wythe and outer wythe layers up to a bottom window or door lintel, in some embodiments.

FIG. 6 shows a sixth step (600) of constructing the wall system, wherein the 3D printer prints additional inner wythe and outer wythe layers up to a bottom window or door lintel layer (601), in some embodiments. As depicted in the construction process snapshot in the sixth step (600), horizontal layers for the inner wythe (201) and the outer wythe (203) are stacked vertically up to the bottom window or door lintel layer (601). In some implementations, wall dams (e.g. 603) are placed at every layer, while attachment brackets and wall ties are placed at every n-th layer by the automated secondary gantry as programmed. In some implementations, if a window and/or a door is not designed into an electronic blueprint of a particular wall for 3D printing, then any construction steps (e.g. FIGS. 6~9, 14, 16, and 17) for window or door lintel installations and opening creations may be skipped altogether.

Figure 7:
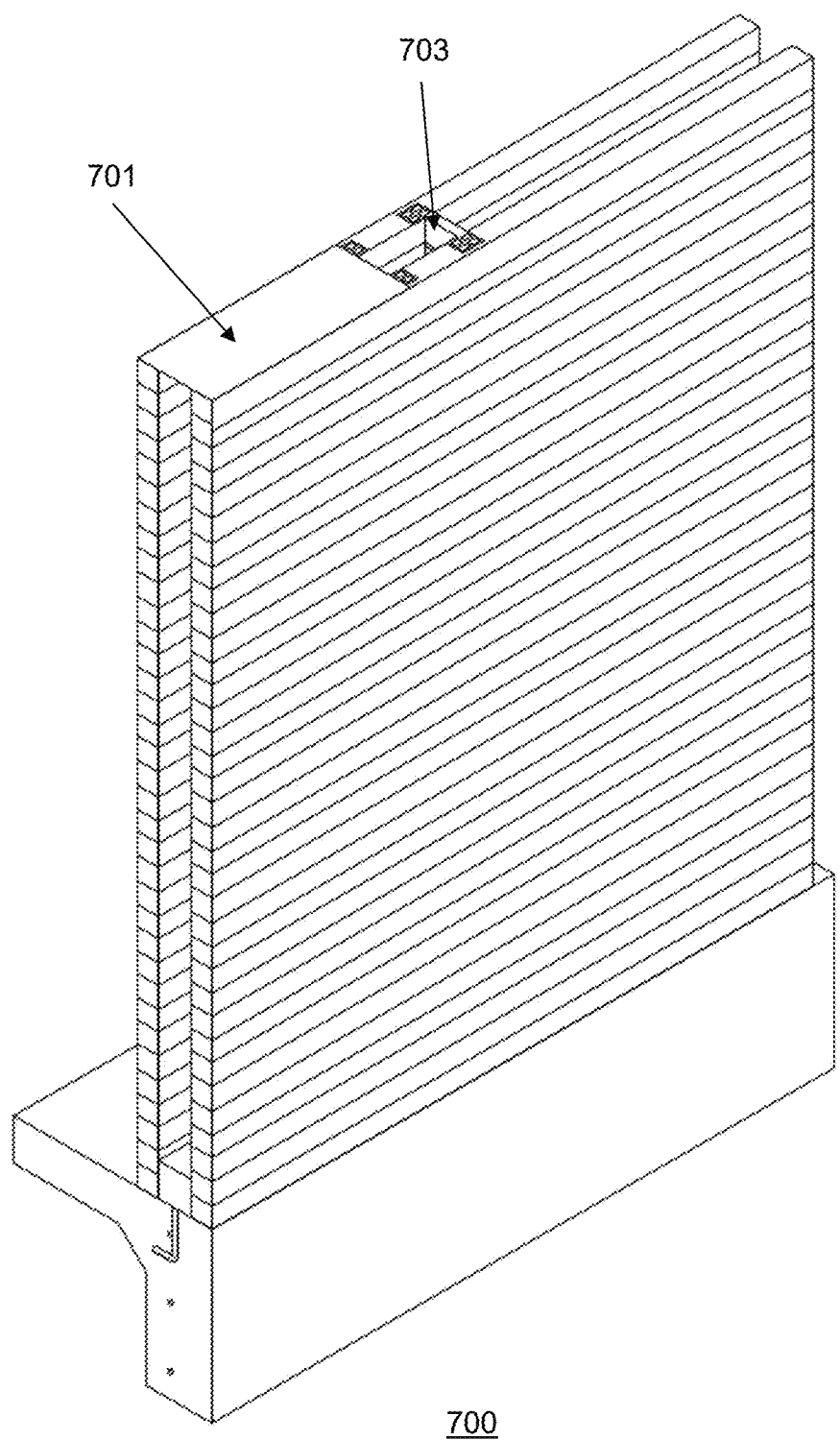
FIG. 7 shows a seventh step of constructing the wall system, wherein a lower lintel form is placed on a layer defining the bottom window or door lintel, in some embodiments.

FIG. 7 shows a seventh step (700) of constructing the wall system, wherein a lower lintel form (701) and a lower lintel dam (703) are placed on a layer defining the bottom window or door lintel, in some embodiments. The lower lintel form (701) is part of a cast-in-place (CIP) structure defined by an upper lintel form, lintel end dams and other wall dams on a plurality of horizontal layers that form a CIP column, and the lower lintel form (701). Furthermore, the lower lintel dam (703) is a type of a wall dam which may be part of the CIP column.

Figure 8:
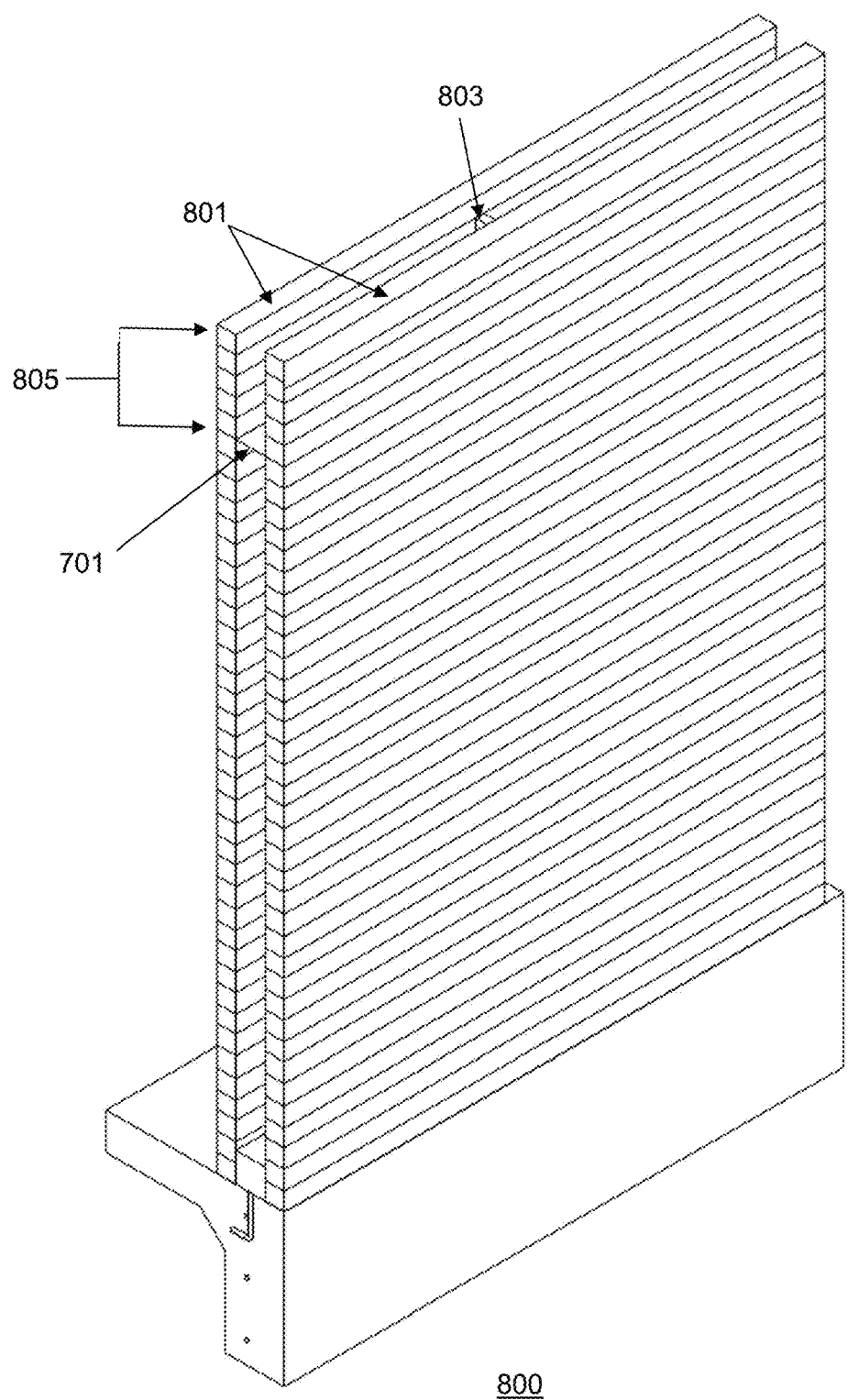
FIG. 8 shows an eighth step of constructing the wall system, wherein additional layers are printed up to a top window or door lintel, in some embodiments.

Once the CIP structure is completed in multiple processing steps, a concrete mixture is subsequently poured into the CIP structure to form reinforced column(s) and lintel(s) for window or door installations. In some embodiments, the lower lintel form (701) supports the bottom of the cast-in-place (CIP) lintel, and is placed by the automated secondary gantry FIG. 8 shows an eighth step (800) of constructing the wall system, wherein additional layers (805) are printed up to a top lintel (801) for a door or a window from the lower intel form (701), in some embodiments. The horizontal layer containing the top lintel (801) also incorporates one or more lintel dams (803), which may be part of the CIP column that forms a concrete reinforcement for window or door installations in subsequent construction steps.

In some embodiments, a pre-programmed number (N) of horizontal layers (i.e. 805 in FIG. 8) is printed up to the top lintel (801) prior to installation of a corresponding window or a door. As described previously, wall dams are placed at every layer, while attachment brackets and wall ties are placed at every n-th layer interval by the automated secondary gantry.

Figure 9:
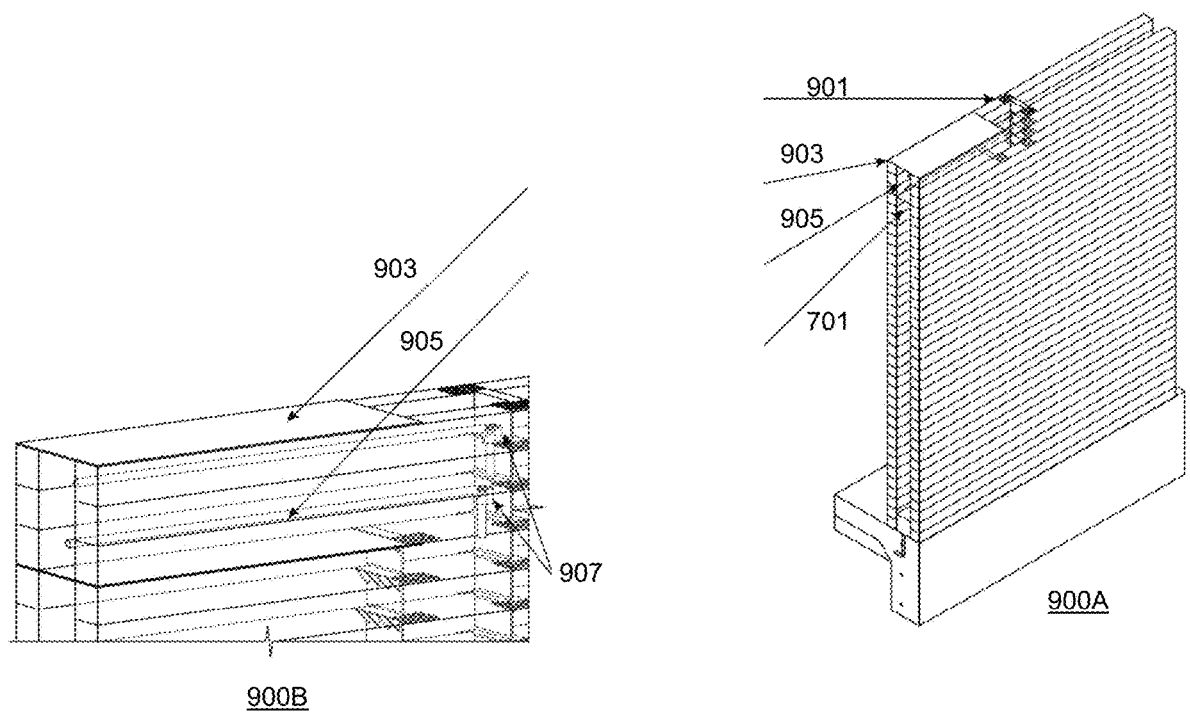
FIG. 9 shows a nineth step of constructing the wall system, wherein an upper lintel form and a lintel reinforcement form are placed on a layer defining the top window or door lintel, in some embodiments.

FIG. 9 shows a nineth step (900A, 900B) of constructing the wall system, wherein an upper lintel form (903) and a lintel reinforcement form (905) are placed on a layer defining the top lintel (i.e. 801 in FIG. 8), in some embodiments. The upper lintel form (903) and the lower lintel form (701) define the thickness of the window or door lintel, as concrete is configured to be poured into the two lintel forms (i.e. 701, 903) as part of a cast-in-place (CIP) at a later processing step. As shown by a perspective view (900A) and a detailed zoomed-in transparent view (900B) for installing the upper lintel form (903) and the lintel reinforcement form (905) in the wall system in FIG. 9, the addition of the lintel reinforcement form (905) provides an increased structural rigidity to the window or door lintel structure after the concrete is poured into and hardened in the cavity defined by the two lintel forms in a later processing step (i.e. FIG. 14).

In some embodiments, one or more wall dams (901) and/or lintel end dams (907) define a single CIP column per horizontal layer. In some embodiments, the lintel end dams (907) may also serve the functionality of being reinforcement locators, as shown in FIG. 9. Furthermore, the entire CIP column for the lintel and/or the window/door frames for subsequent concrete pouring in the wall system is, in some implementations, defined by a plurality of wall dams and/or lintel end dams in vertical stacks of the horizontal layers for the outer and the inner wythes as demonstrated, for example, in FIGS. 14 and 15. In some embodiments, the automated secondary gantry installs the lintel reinforcement form (905) in each lintel pocket first, and then places the upper lintel form (903). This process seals and reinforces the lintel structure. Importantly, the seamless integration of lintels with multi-function wall dams reduces the overall complexity of the wall system, which in turn provides efficient, reliable, and cost-effective wall construction processes.

Figure 10:
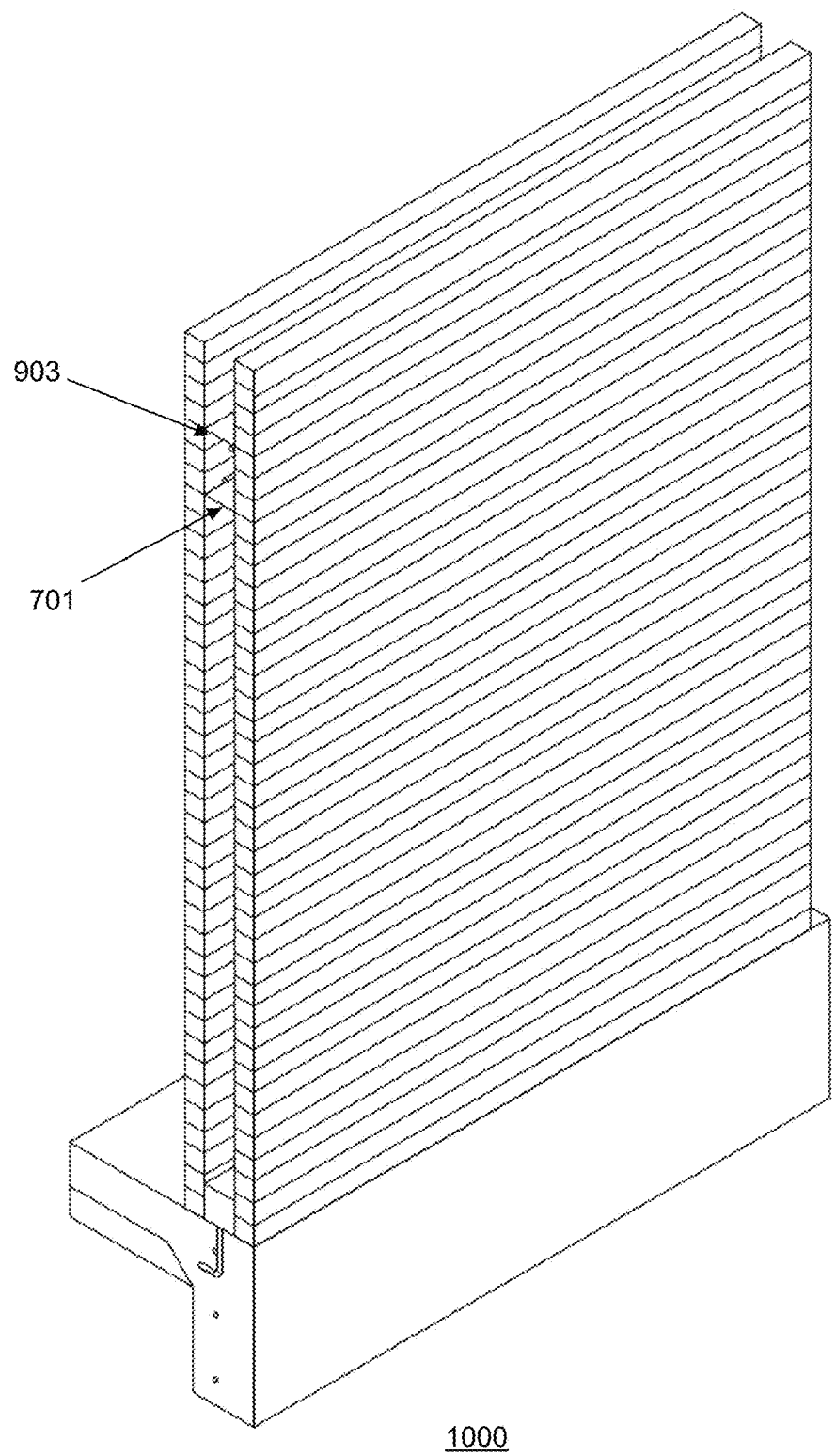
FIG. 10 shows a tenth step of constructing the wall system, wherein one or more remaining layers are printed to the top of the wall, in some embodiments.

FIG. 10 shows a tenth step (1000) of constructing the wall system, wherein one or more remaining layers above the lintel structure (i.e. defined by the lower lintel form (701) and the upper lintel form (903) are printed to the intended top height of the wall system, in some embodiments. As shown in this illustration, an extra number of layers (i.e. N-layers) is printed up to the top of the composite wall structure. In some implementations, the height of the wall is pre-defined and programmed as part of an electronic blueprint of the wall, wherein the electronic blueprint is executed by a computer system or another control unit contained or operatively connected to the special purpose-built 3D printer. Furthermore, wall dams are placed at every layer, while attachment brackets and wall ties are placed at every n-th layer interval by the automated secondary gantry executing the electronic blueprint.

Figure 11:
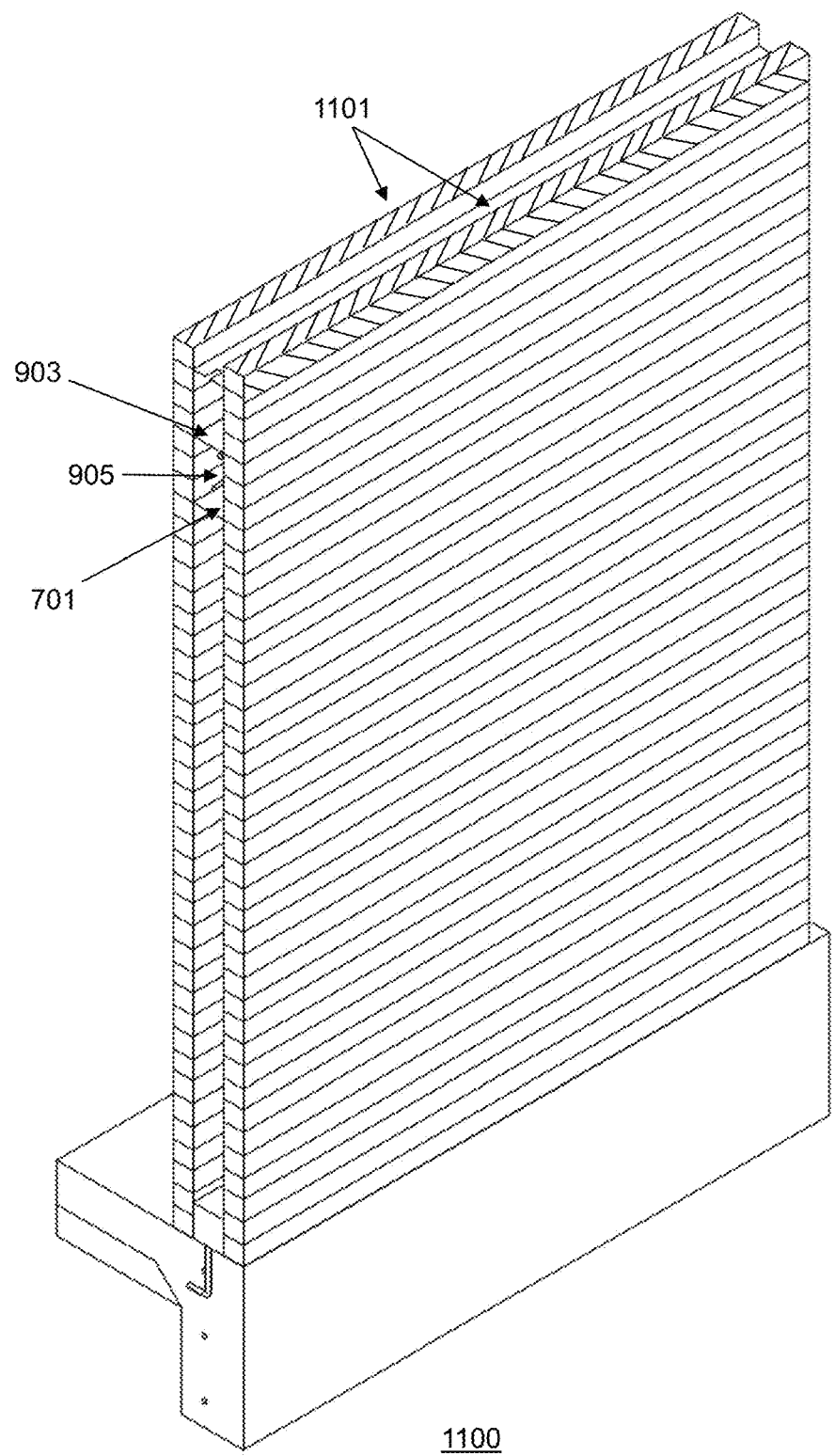
FIG. 11 shows an eleventh step of constructing the wall system, wherein one or more sill caps are placed on the top of the wall, in some embodiments.

FIG. 11 shows an eleventh step (1100) of constructing the wall system, wherein a sill cap (1101) is placed on the top of the wall, in some embodiments. If a window or a door is configured to be integrated in the wall's construction blueprint, the lower lintel form (701), the upper lintel form (903), and the lintel reinforcement (905) are installed prior to placing the sill cap (1101) by the automated secondary gantry.

Figure 12:
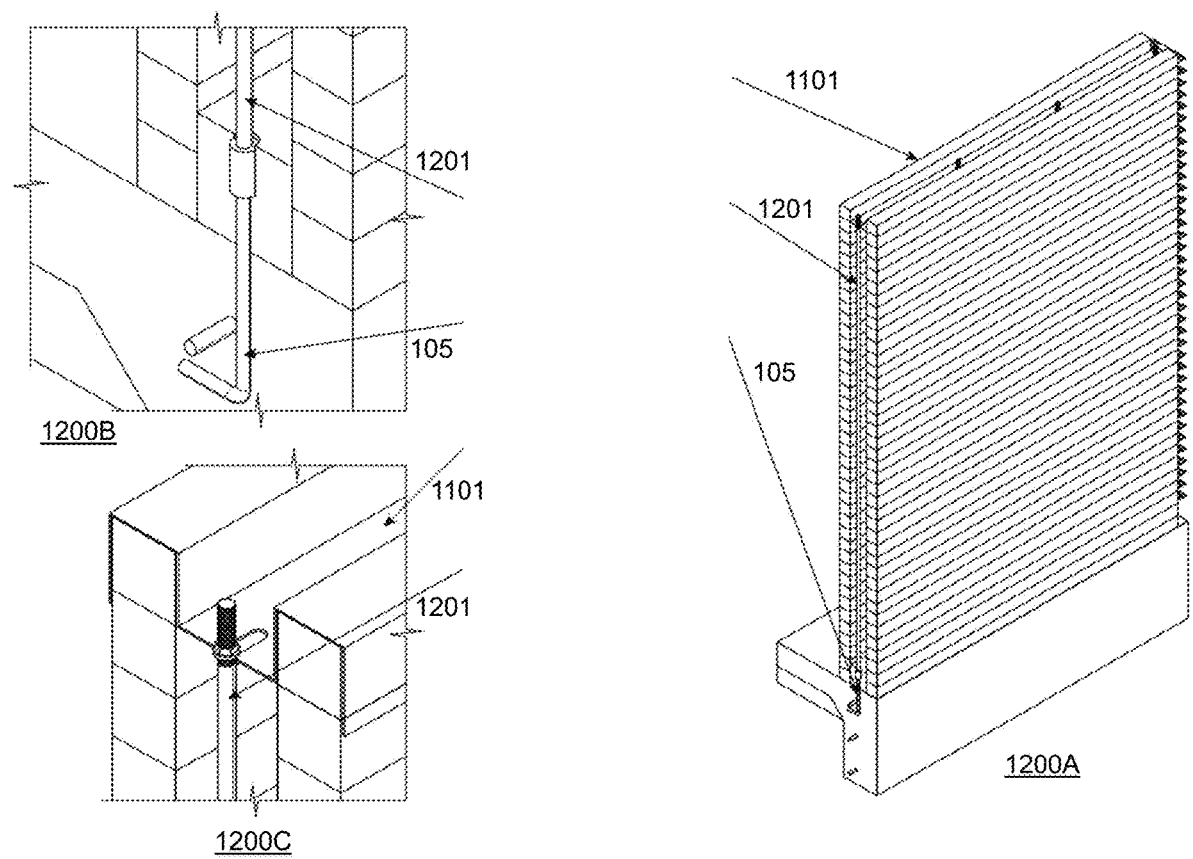
FIG. 12 shows a twelfth step of constructing the wall system, wherein tension tendons are installed through the sill caps, in some embodiments.

The sill cap (1101) includes a formed structural component made of metallic and/or other sturdy materials. This formed structural component, referred to as a "curb" in some implementations, encapsulates the top portion of the inner and the outer wythes. As illustrated in FIG. 11 and FIG. 12, each sill cap (1101) has two curbs, one for the inner wythe and another for the outer wythe. The sill cap (1101) also has a central trough, which is, in some implementations, positioned and/or indented below the height of each curb, as shown in a zoomed-in detailed view (1200C) in FIG. 12.

In some embodiments, the central trough of the sill cap (1101) also has one or more pierced openings that allow utility components or cables to be threaded through the central trough. Furthermore, the central trough of the sill cap (1101) also incorporates one or more spaced openings for attachment of the tension tendons (e.g. 1201 in FIGS. 12 and 13, 2203 in FIG. 22A) that provide adjustable vertical tensile forces to keep the wall system structurally rigid and coherent.

Figure 18:
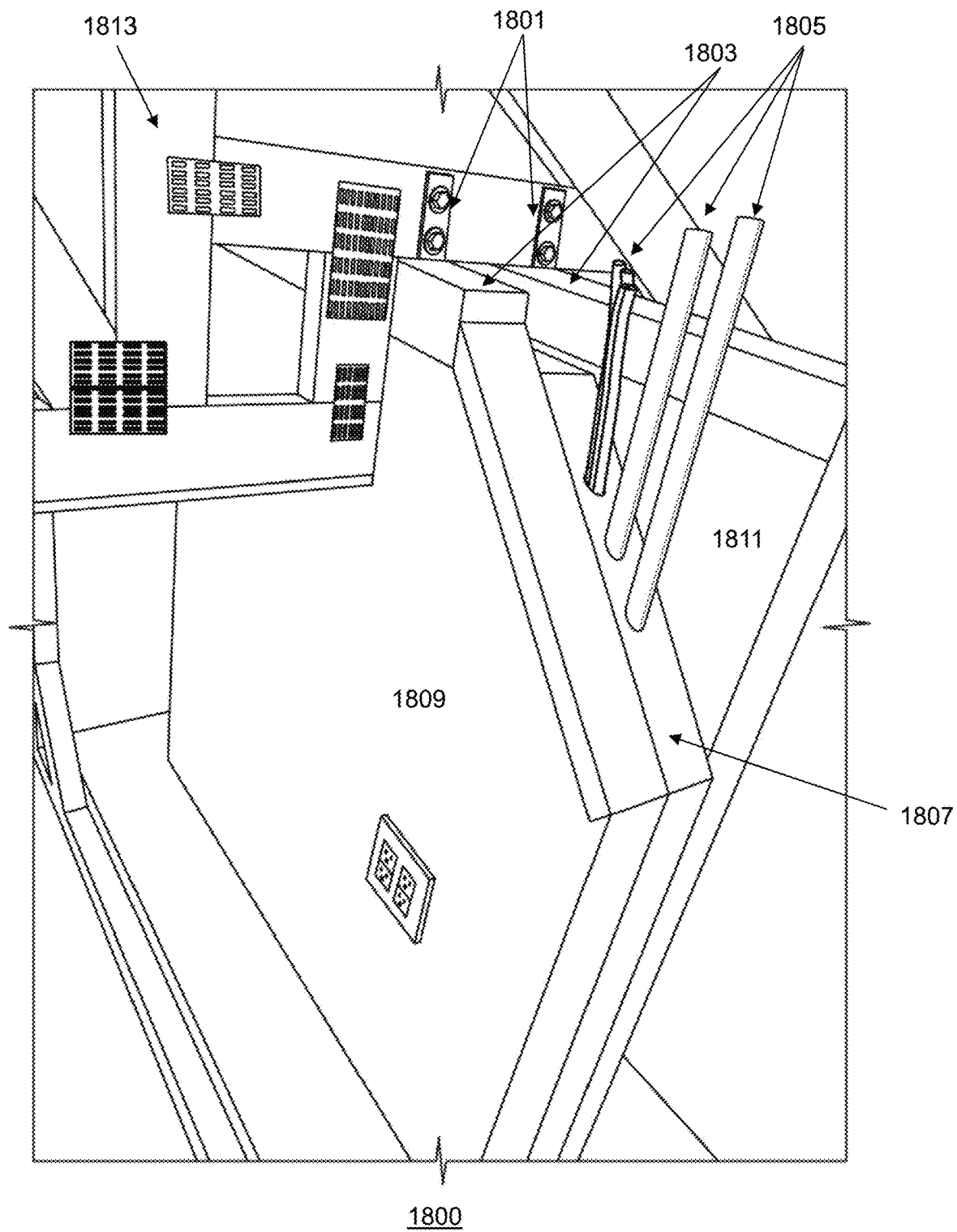
FIG. 18 shows a cross section of the completed wall system that incorporates utility lines, sill caps, insulation, and integrated truss brackets, in some embodiments.

In some embodiments, each curb portion of the sill cap (1101) also includes one or more vertical metal tabs (e.g. 1801 in FIG. 18), referred to as "gang nail tabs," that rise up from the surface of the curb to allow placement of standard roof trusses (e.g. 1813 in FIG. 18) into the vertical metal tabs, as illustrated in FIG. 18. In some cases, the gang nail tabs further incorporate or allow toothed protrusions to be pressed into the wooden portion of a roof truss, and may also include holes that accommodate the bolting of the roof truss. Moreover, some sill caps also incorporate formed connector plates that are configured to join intersecting wall sections, which enable formation of right-angled walls, T-shaped intersections, or other desired architectural variations. The sill cap (1101) can, in some implementations, replace headers and grouted collar joints in conventional wall designs.

FIG. 12 shows a twelfth step (1200A, 1200B, 1200C) of constructing the wall system in a perspective view (1200A) and also in zoomed-in detailed views (1200B, 1200C), wherein tension tendons (1201) are installed through the sill cap (1101), in some embodiments. As shown in this illustration, the automated secondary gantry installs the tension tendons (1201) that extend from the top to the bottom of the wall system through the sill cap (1101), wherein each tension tendon (1201) is fastened to a corresponding foundation anchor directly as shown in FIG. 12, or to an attachment point (e.g. 103 in FIG. 1) of the foundation anchor (e.g. 105 in FIG. 1).

In some implementations, the wall system contains a multiple number of foundation anchors and attachment points at the bottom portion of the interstitial space for a corresponding multiple number of tension tendons to provide the structural rigidity through tensile strength along the length of the interstitial space. In some implementations, the spacing of the tension tendons is configured to provide downforce tensile strengths in accordance with engineering calculations for the structural integrity of the wall system. Once the tension tendons (e.g. 1201 in FIGS. 12 and 13, 2203 in FIG. 22A) are installed and positioned to extend from the sill cap (1101) to the foundation anchors or the attachment points of the foundation anchors, the automated secondary gantry can adjust the amount of tensions in the tension tendons, which effectively transfers at least some tensile loads to the sill cap (1101).

The post-tensioning capability of the tension tendons, as shown in FIG. 12, can provide substantial advantages to conventional walls. The post-tensioning of the tension tendons ensures that the composite wall structure of the two wythes is able to retain a satisfactory level of tensile strengths indefinitely for its structural integrity, as tensions can be periodically checked and adjusted at any time after the construction of the wall system. Furthermore, the utilization of the tension tendons enable engineers to set a calculated amount of tension in the wall system to account for any desirable wall flex that can prevent wall cracking or disintegration under wind or seismic stresses.

In addition, the incorporation of the tension tendons in the wall system also provides an advantageous "self-righting" tendency to the composite wall structure, because the tension acting on the dry-stacked masonry-like structure allows for fanning and flexing of individual layers, while providing sufficient forces to return the layers back to their original orientations and positions due to the tensioning acting on the centerline of the wall assembly, in some implementations.

Moreover, it should be noted that the sill cap in the wall system also provides unique advantageous relative to conventional wall structures. For example, the utilization of the sill cap enables a precise separation of the composite two-wythe structure with a consistent width for the interstitial space. The sill cap also functions as an anchorage for tension tendons, pass-through openings for utilities, and insulation placement access points. Furthermore, the sill cap also acts as a load spring plate to transfer the point-loaded tension of each tendon evenly across the top surface of the inner and the outer wythes. In addition, the curbs on the sill cap can function as multiple structural anchorage points to tie roof members to the composite wall structure, while the trough of the sill cap can be further utilized as a raceway for utility system component installations.

Figure 13:
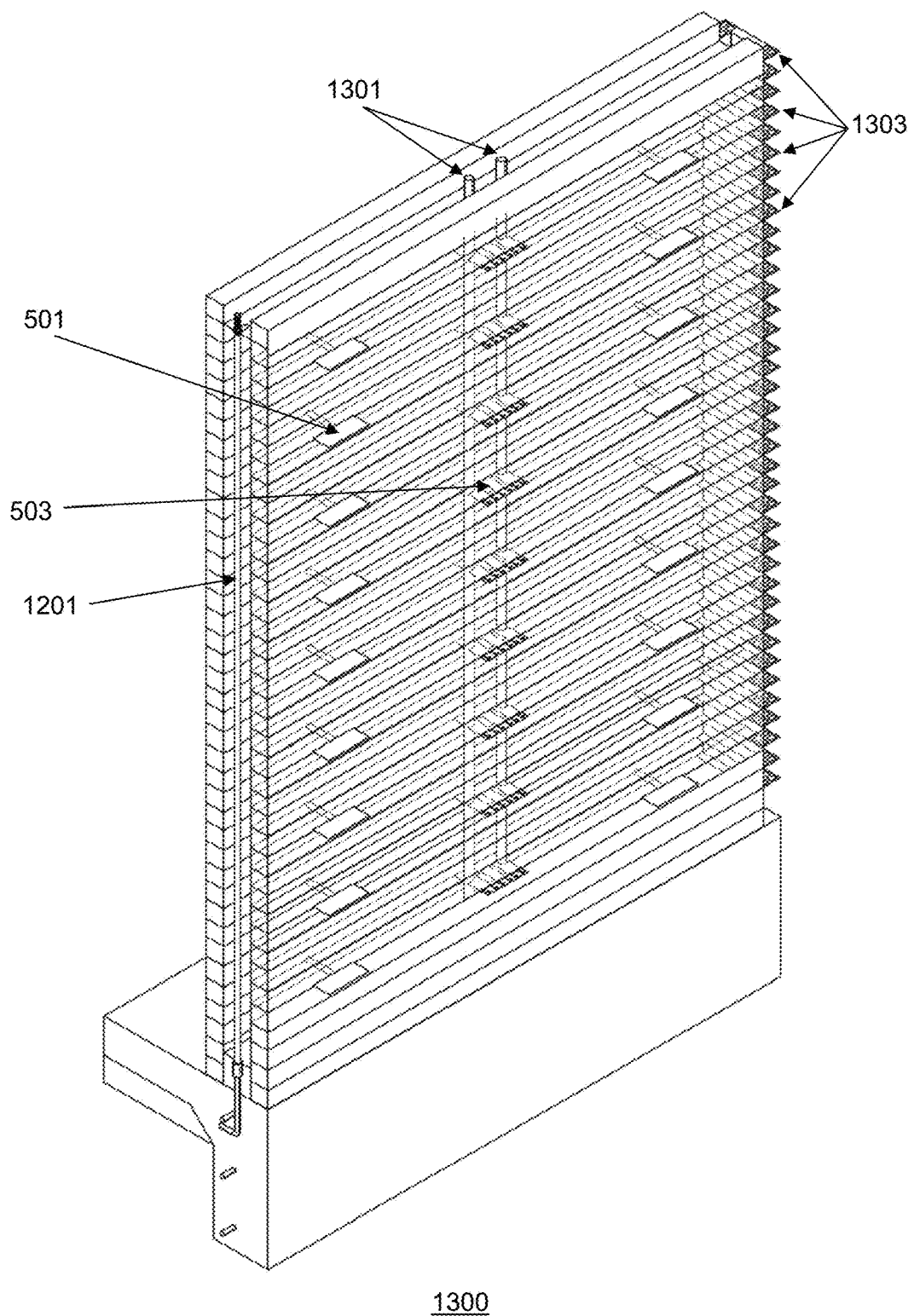
FIG. 13 shows a thirteenth step of constructing the wall system, wherein utility lines are placed vertically through the attachment brackets, which were previously installed in n-th layers during the multi-layer printing, in some embodiments.

FIG. 13 shows a thirteenth step (1300) of constructing the wall system and depicts a transparent view of installing utility components and lines vertically. The utility lines (1301) and/or utility components are placed vertically through the attachment brackets (503), which were previously installed in every n-th layer intervals during the multi-layer printing, in some embodiments. Examples of utility lines (1301) and/or utility components include, but are not limited to, electrical cables, water pipes, sewage pipes, communication cables, and HVAC components. The utility lines and components can be installed by the automated secondary gantry, which routes individual lines and components through the sill cap and down through the attachment brackets (503).

In some embodiments, each attachment bracket for utility lines or equipment is placed horizontally between the two wythes in the interstitial space as an anchorage or a housing for electrical cables, water pipes, heating/ventilation/air conditioning (HVAC) components, or other utility-related items. The attachment brackets (503) may also function as a machine-recognized locator for utility installations in the interstitial space. Moreover, in some embodiments, some attachment brackets may also serve a dual purpose of being a wall tie as well as a utility anchorage. In such embodiments, the dual-purpose attachment brackets are configured to contribute to the increased structural rigidity of the wall system by providing transference of out-of-plane forces between the inner and the outer wythes.

In some implementations, the wall ties (501) are also installed in the same n-th layer intervals by the automated secondary gantry. However, in some cases, the wall ties (501) may be on different n-th layer intervals from the attachment brackets (503), depending on wall design requirements and specifications. As shown in this illustration, unlike the wall ties (501) and the attachment brackets (503), wall dams (1303) are placed in every horizontal layer to contain insulation foams and/or concrete mixtures, which are later injected into pre-defined slots (e.g. cast-in-place lintels and columns, insulation spaces defined by the positioning of multiple wall dams, etc.) in the interstitial space based on wall design requirements.

Figure 14:
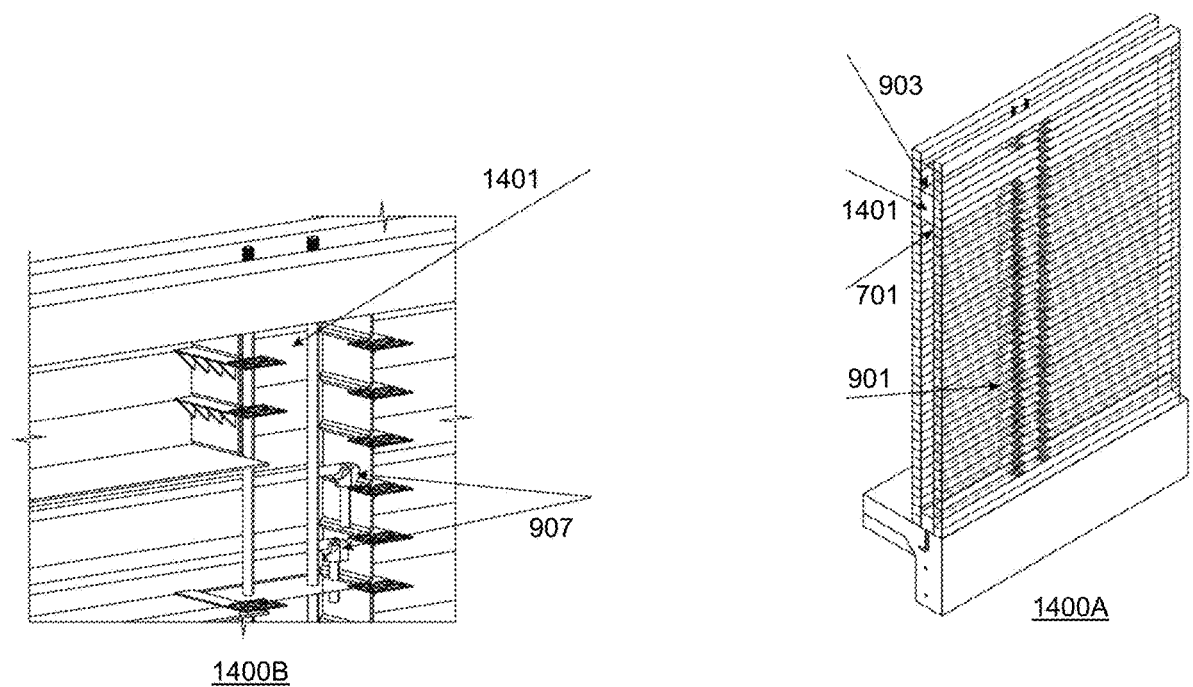
FIG. 14 shows a fourteenth step of constructing the wall system, wherein reinforced columns and lintels for a window or a door are formed by installing concrete into a cavity defined by window or door lintel forms and wall dams that function as a cast-in-place (CIP) for the installed concrete, in some embodiments.

FIG. 14 shows a fourteenth step of constructing the wall system in a perspective view (1400A) and a zoomed-in transparent view (1400B), wherein reinforced cast-in-place (CIP) lintels and column (1401) for a window or a door are formed by pouring concrete into a cavity defined by window or door lintel forms (701, 903), wall dams (901), and lintel end dams (907) that function as a cast-in-place (CIP) for the poured concrete, in some embodiments.

As illustrated in this figure, the automated secondary gantry can pour concrete into the CIP-specific cavity of the interstitial space. In some implementations, the upper lintel form (903), the lower lintel form (701), the reinforced CIP lintels and column (1401), the wall dams (901), and the lintel end dams (907) are configured to fully encapsulate and contain the pre-hydrated concrete prior to hydration and hardening. Subsequently, the hardened concrete in the CIP-specific cavity, the lintel reinforcements (e.g. 905 in FIG. 9), and tension tendons (1201 in FIGS. 12 and 13) form the completed reinforced columns and lintels throughout the wall system, in accordance with the associated electronic blueprint of the wall.

Figure 15:
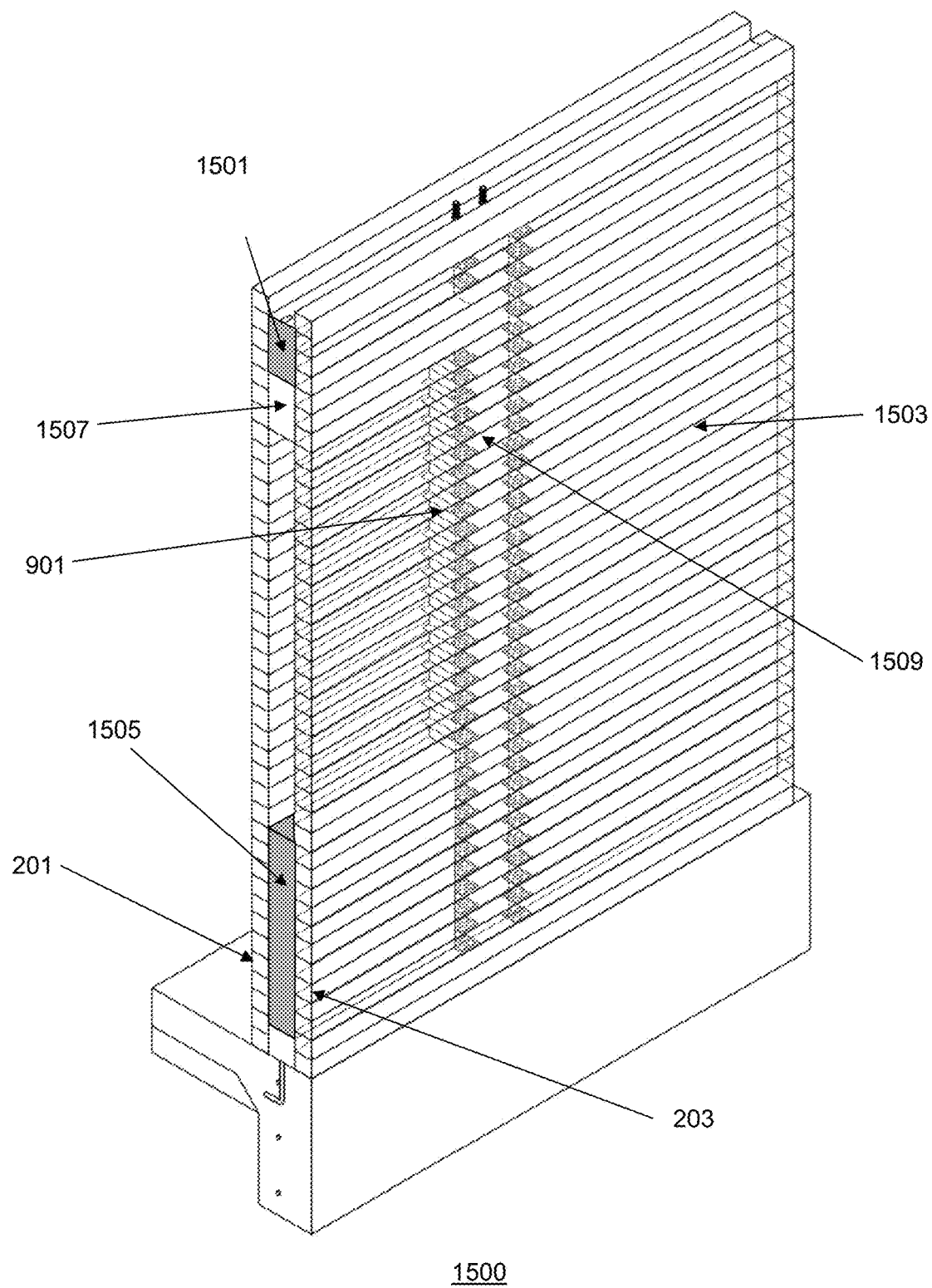
FIG. 15 shows a fifteenth step of constructing the wall system, wherein an insulation material is dispensed into a remaining interstitial space between the inner wythe and the outer wythe of the wall, in some embodiments.

FIG. 15 shows a fifteenth step (1500) of constructing the wall system, which demonstrates how insulation materials fill up the interstitial space outside of a CIP lintel (1507) and a CIP column (1509) area in the wall system. In some implementations, the insulation materials are dispensed into a remaining interstitial space between the inner wythe (201) and the outer wythe (203) of the wall, in some embodiments. In this particular illustration, the insulation materials occupy three separate locations: a first insulation foam chamber (1501) formed above the CIP lintel (1507), a second insulation foam chamber (1503) adjacent to the CIP column (1509), and a third insulation foam chamber (1505) formed below the bottom frame of a space for a window or a door.

In some embodiments, the automated secondary gantry dispenses the insulation materials into the remaining interstitial space designated for insulation, thus filling all remaining voids with insulating foam. The insulation foams are configured to bond to the inner surfaces of the two wythes, which in turn increases the structural coherence of the wall system. The insulation foams act as mechanical attachments to the inner and the outer wythes, and are also thermal and sonic insulators in most cases. Furthermore, the insulation foams can also serve as moisture barriers and load-bearing members that resist crushing, shearing, and flexing of the completed wall system.

Figure 16:
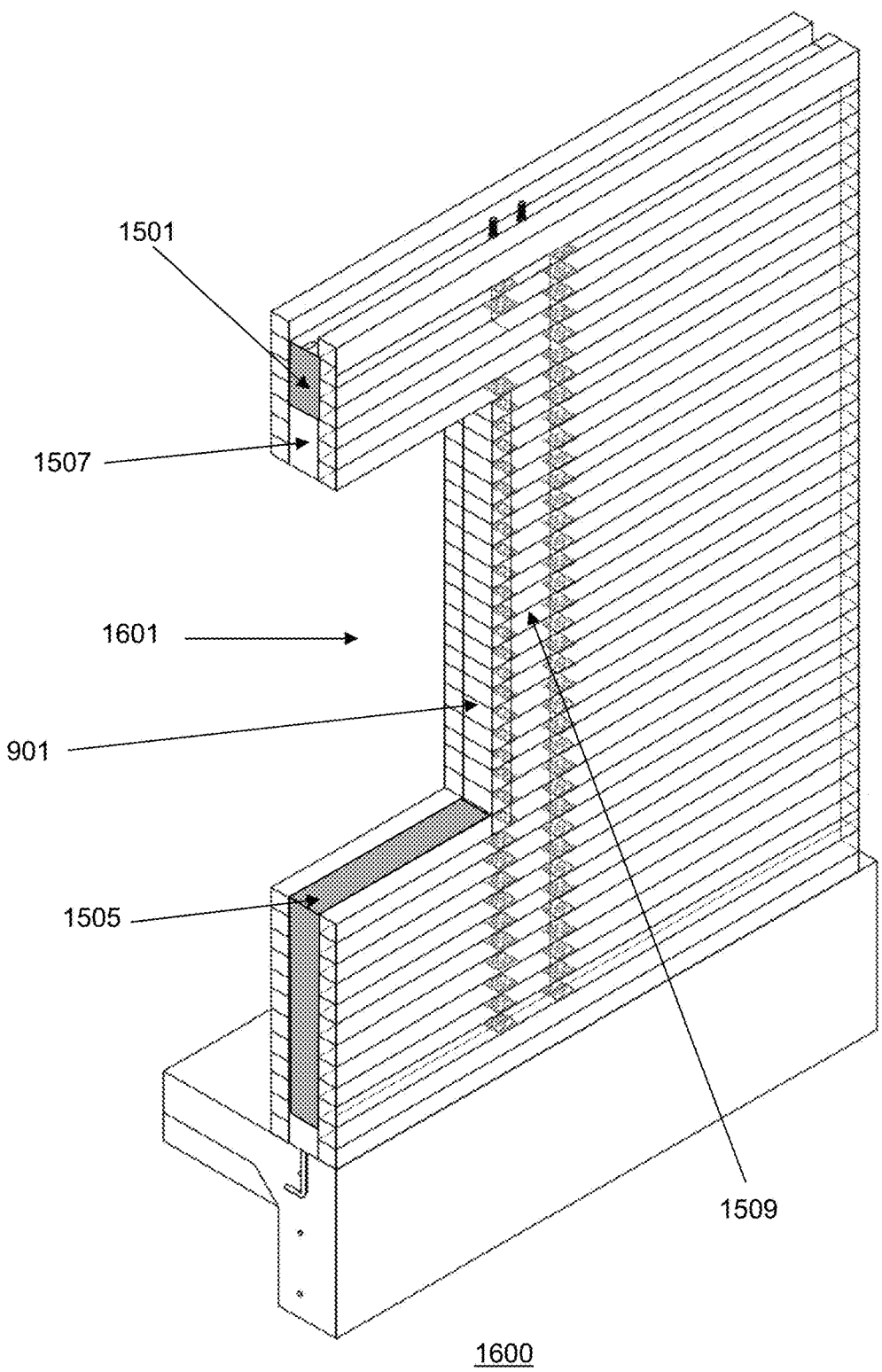
FIG. 16 shows a sixteenth step of constructing the wall system, wherein an opening for a window or a door is created by cutting through an area defined by lintel forms and a vertical column formed by wall dams in multiple layers, in some embodiments.

FIG. 16 shows a sixteenth step (1600) of constructing the wall system, wherein an opening (1601) for a window or a door is created by cutting through an area defined by the CIP lintel (1507), the CIP column (1509), and the wall dams (901) in multiple layers, in some embodiments. The automated secondary gantry is, in some implementations, utilized to cut through the composite wall structure to create a rough outline of the opening (1601). As illustrated in FIG. 16, the insulation foams (e.g. 1501, 1505) that were previously injected into the designated insulation cavities mostly avoid the cutting and remain in place as part of the wall structure.

Figure 17:
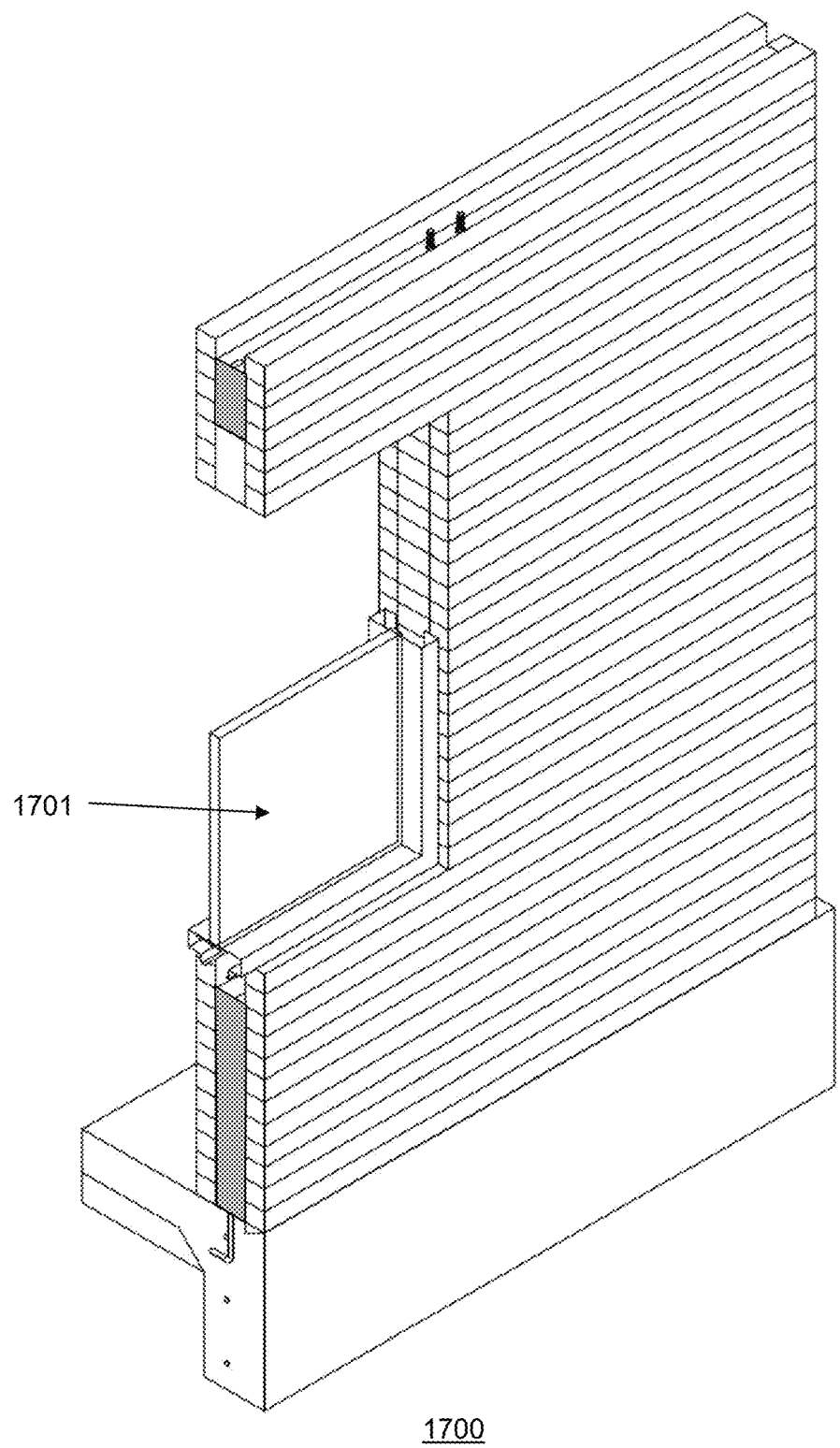
FIG. 17 shows a seventeenth step of constructing the wall system, wherein a window, a door, or an MEP (mechanical, electrical, plumbing) hardware is installed in the opening created from the sixteenth step, in some embodiments.

FIG. 17 shows a seventeenth step (1700) of constructing the wall system, as a perspective view of installing a window, a door, and/or an MEP (mechanical, electrical, plumbing) hardware in the opening (i.e. 1601 in FIG. 16) created from the sixteenth step (i.e. 1600 in FIG. 16), in some embodiments. In this particular illustration, a window (1701) is placed into a portion of the opening previously cut by the automated secondary gantry. Preferably, the automated secondary gantry is also configured to install a desired window, door, or MEP component in the opening without much human intervention. In some implementations, a human crew may be assigned to manually install the desired window, door, or MEP component, even as much of the wall system construction is completed by automated machines, such as the special purpose-built 3D printer and the automated secondary gantry.

FIG. 18 shows a cross section (1800) of the completed wall system that incorporates utility lines (1805), insulation (1807), a sill cap (1803), and integrated truss brackets with vertical metal tabs (1801) on the sill cap (1803), in some embodiments. As shown in the cross section (1800) of the completed wall system, the interstitial space filled with the insulation (1807), which encapsulate the utility lines (1805), is sandwiched by an outer wythe (1811) and an inner wythe (1809) incorporating an electrical outlet. Furthermore, the outside surface of each of the two wythes may be painted, coated, or plastered with lime or stucco as desired by the architect.

The utilization of the sill cap (1803) and the integrated truss brackets with vertical metal tabs (1801), as shown in the cross section (1800) of the completed wall system, eliminates the need for collar joints or bond layers, and also provides convenient spacing control between the two wythes. Furthermore, the sill cap (1803) and the integrated truss brackets with vertical metal tabs (1801) serve as a positive connection to roof trusses (1813) with integrated gang nails and hurricane straps. Moreover, this metal-formed sill cap design integrates with the completed wall system to act as a built-in cable and utility-routing trough, while also effectively connecting the roof trusses (1813) to tension tendons to reduce the potential for crush or pull-outs that are often associated with wooden sill plates. If the completed wall system experiences catastrophic forces such as earthquakes or hurricanes, joints in the composite wall structure can flex slightly, thus radially distributing the external shock forces across the entire structure, followed by a desirable lock-up as a single and solid interconnected unit.

Figure 19A:
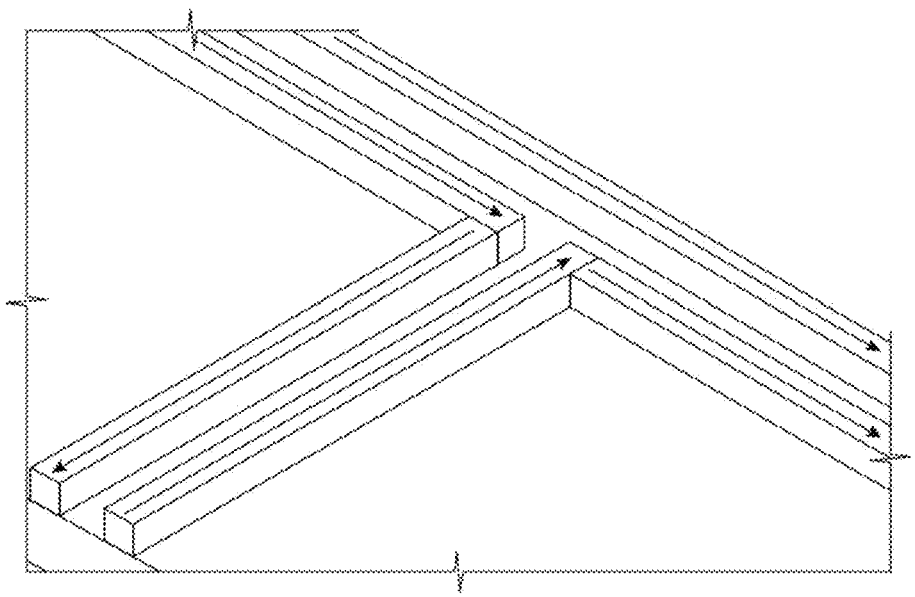
FIG. 19A shows a first concrete wythe layer pattern for a T-corner.
Figure 19B:
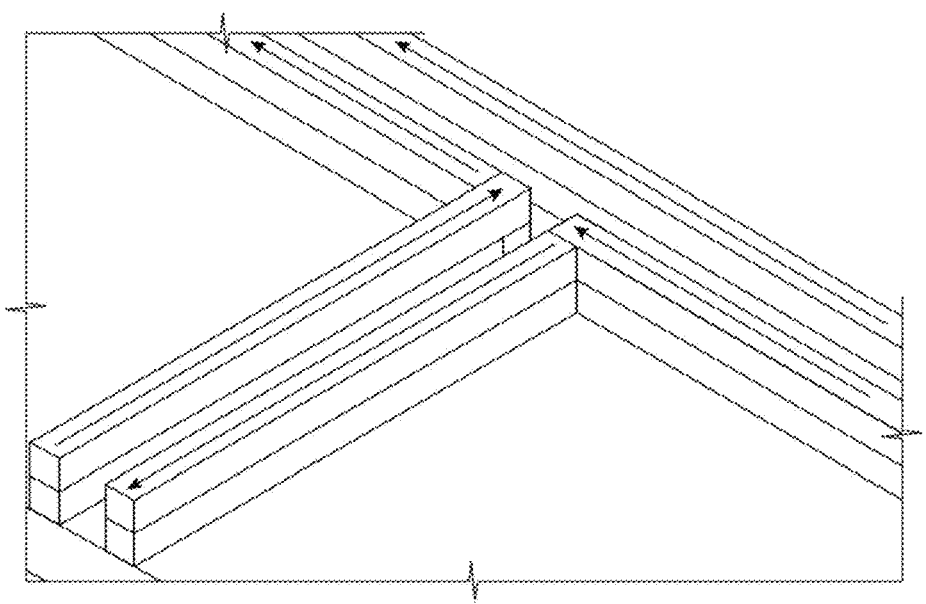
FIG. 19B shows a second concrete wythe layer pattern for the same T-corner one layer above the first concrete wythe layer pattern, in some embodiments.

FIG. 19A shows a first concrete wythe layer pattern (1900A) for a T-corner, and FIG. 19B shows a second concrete wythe layer pattern (1900B) for the same T-corner one layer above the first concrete wythe layer pattern, in some embodiments. The special purpose-built 3D printer can extrude concrete wythes in a unique pattern that alternates from one layer to another layer. This alternating concrete-printing pattern allows corners to overlap, and the special purpose-built 3D printer can print walls butted up to other walls in a T-shape, as shown in FIGS. 20A and 20B.

Figure 20A:
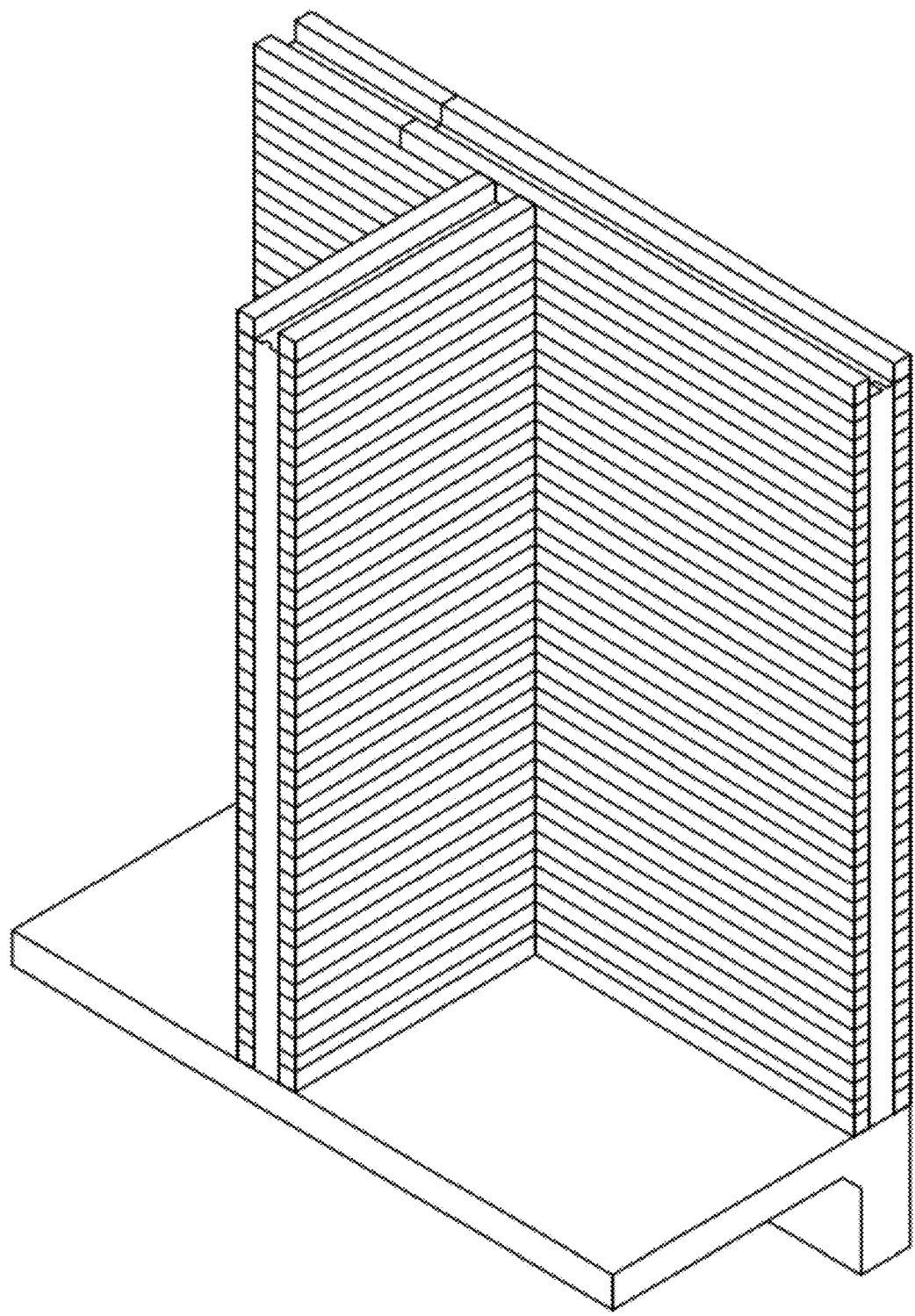
FIG. 20A shows a perspective view of the completed T-corner with two concrete wythe layer patterns alternating from one layer to another for creating sharp and overlapped corners, in some embodiments.

FIG. 20A shows a perspective view (2000A) of the completed T-corner with two concrete wythe layer patterns alternating from one layer to another for creating sharp and overlapped corners, in some embodiments.

Figure 20B:
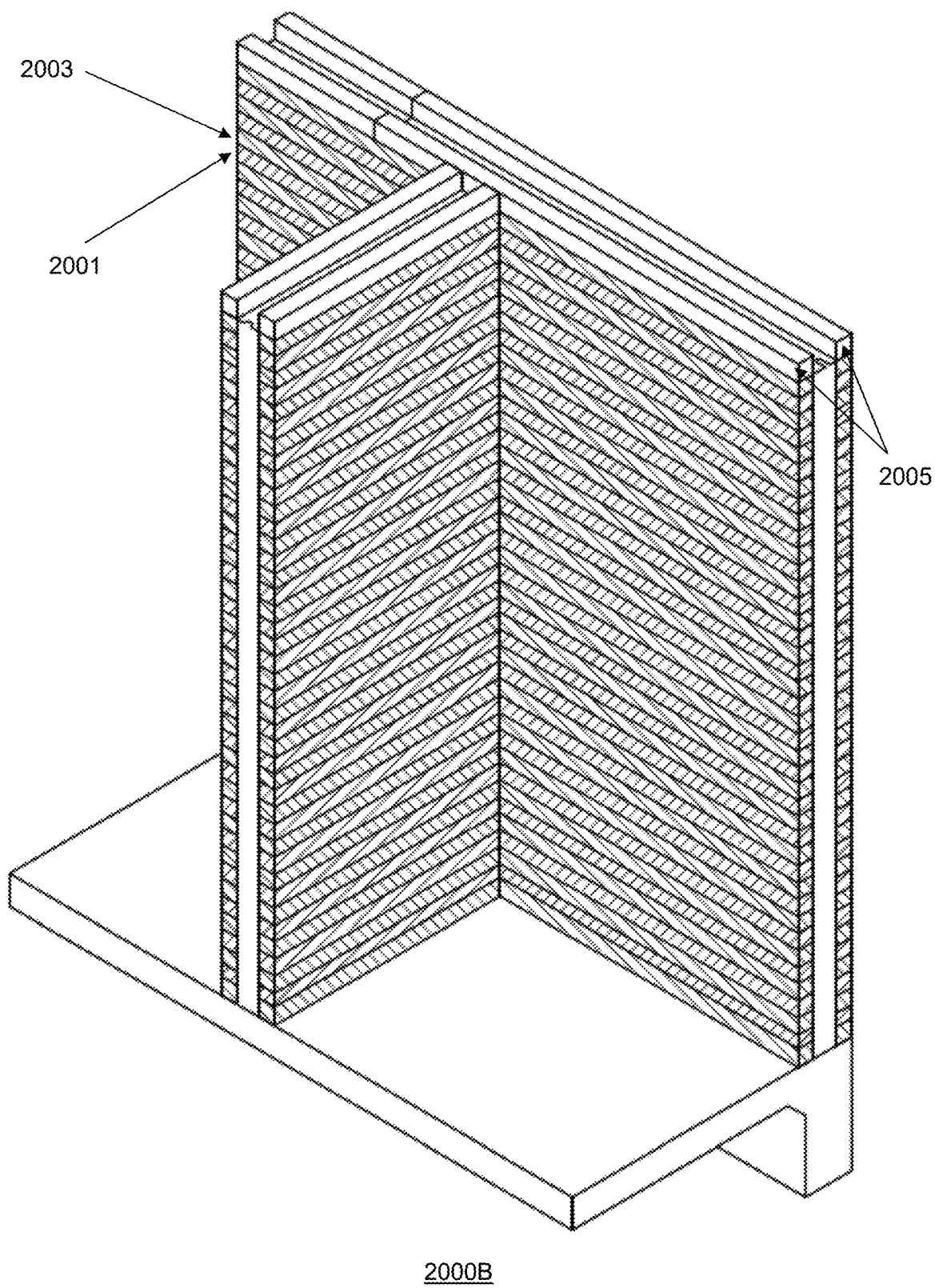
FIG. 20B shows a perspective and layered view of the completed T-corner with two concrete wythe layer patterns alternating from one layer to another for creating sharp and overlapped corners, in some embodiments.

FIG. 20B shows a perspective and layered view (2000B) of the completed T-corner with two concrete wythe layer patterns alternating from one layer to another for creating sharp and overlapped corners, in some embodiments. As illustrated in this figure, the completed T-corner incorporates a first concrete wythe layer pattern (2001) and a second concrete wythe layer pattern (2003) that alternate from one layer to the next in a vertical stack. A sill cap (2005) encapsulates the top portion of the composite wall with the two wythes separated by an interstitial space, as shown in FIG. 20B.

Figure 21A:
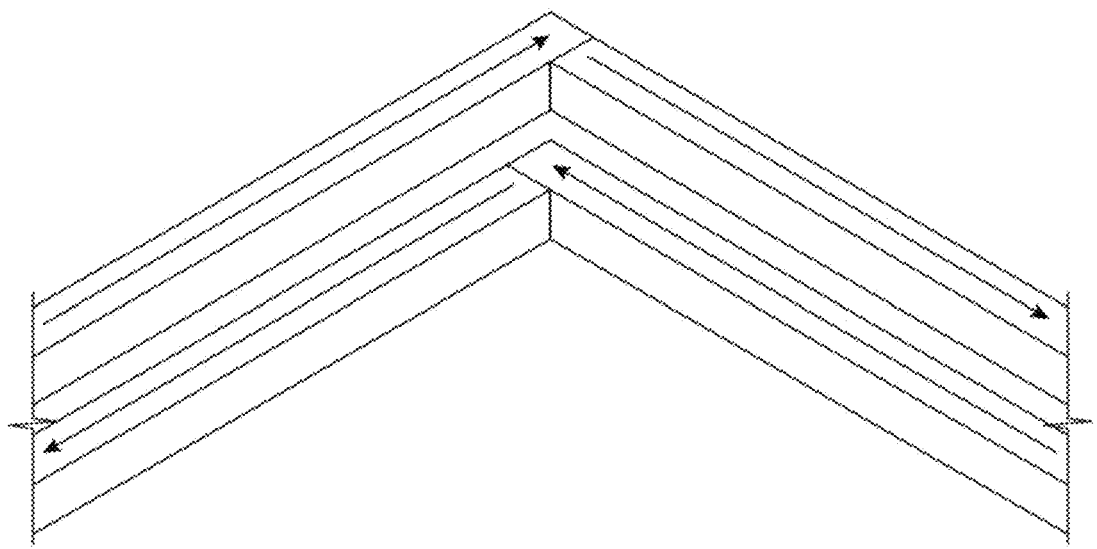
FIG. 21A shows a first concrete wythe layer pattern for a 90-degree corner.
Figure 21B:
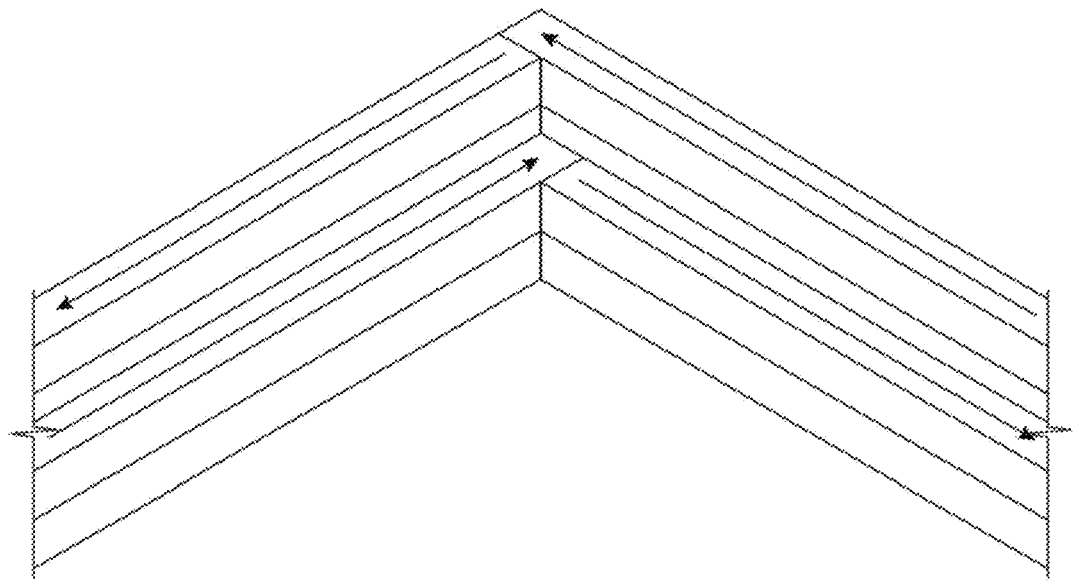
FIG. 21B shows a second concrete wythe layer pattern for the same 90-degree corner one layer above the first concrete wythe layer pattern, in some embodiments.

FIG. 21A shows a first concrete wythe layer pattern (2100A) for a 90-degree corner, and FIG. 21B shows a second concrete wythe layer pattern (2100B) for the same 90-degree corner one layer above the first concrete wythe layer pattern, in some embodiments. The special purpose-built 3D printer can extrude concrete wythes in a unique pattern that alternates from one layer to another layer. This alternating concrete-printing pattern allows corners to overlap, and the special purpose-built 3D printer can print walls with greater structural and aesthetic properties with a cross-woven 90-degree corner.

Figure 22A:
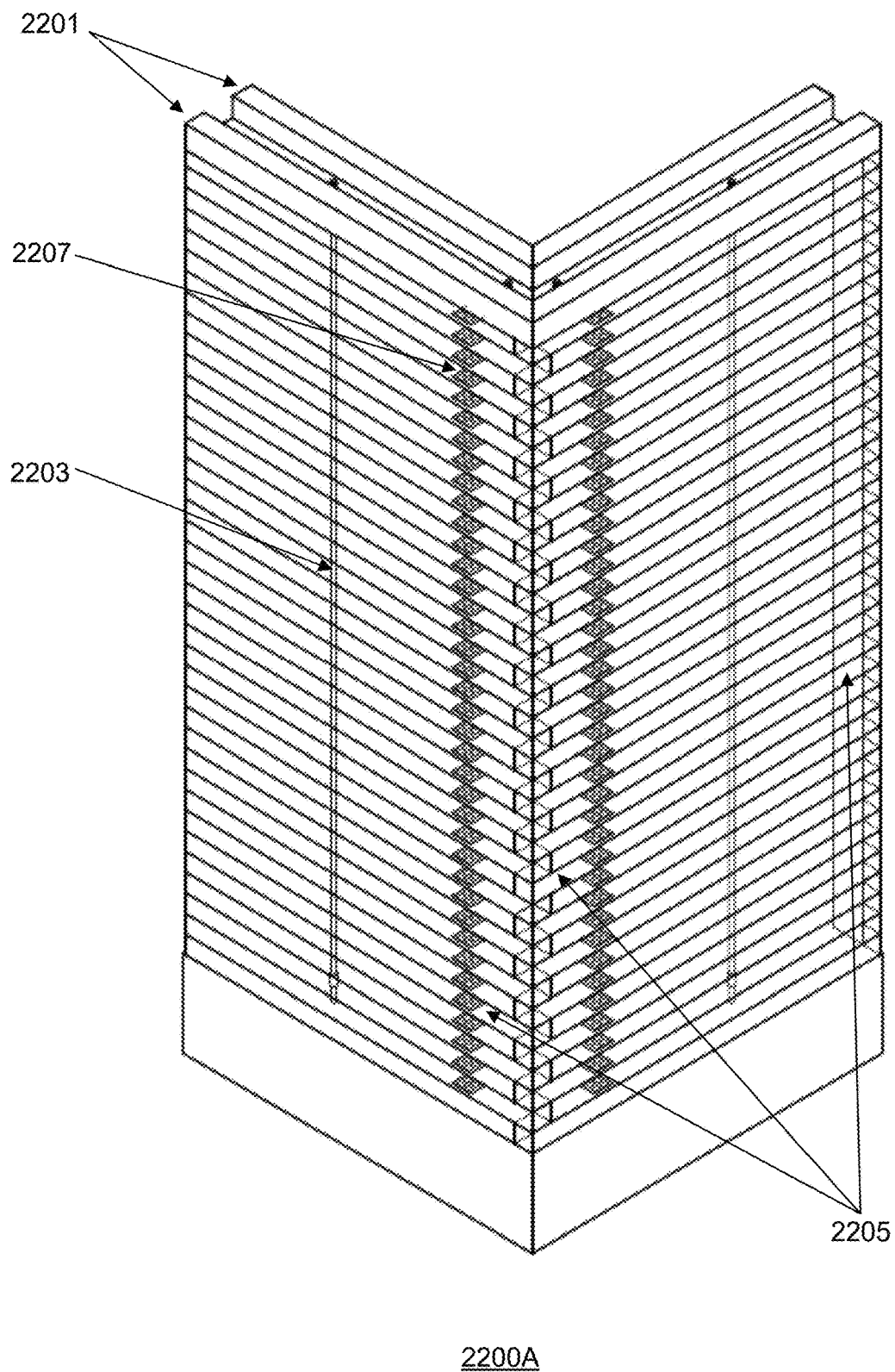
FIG. 22A shows a transparent outer view of the 90-degree corner with alternating layer patterns and multiple structural elements, in some embodiments.

FIG. 22A shows a transparent view (2200A) of an outer 90-degree corner with alternating layer patterns and multiple structural elements, in some embodiments. Because the transparent view (2200A) shows some of the inner components of the 90-degree corner, a tension tendon (2203), wall dams (2207), and CIP columns (2205) inside the completed wall system of the 90-degree corner are visible. Furthermore, a sill cap (2201) encapsulates the top portion of the composite 90-degree corner wall with the two wythes separated by an interstitial space.

Figure 22B:
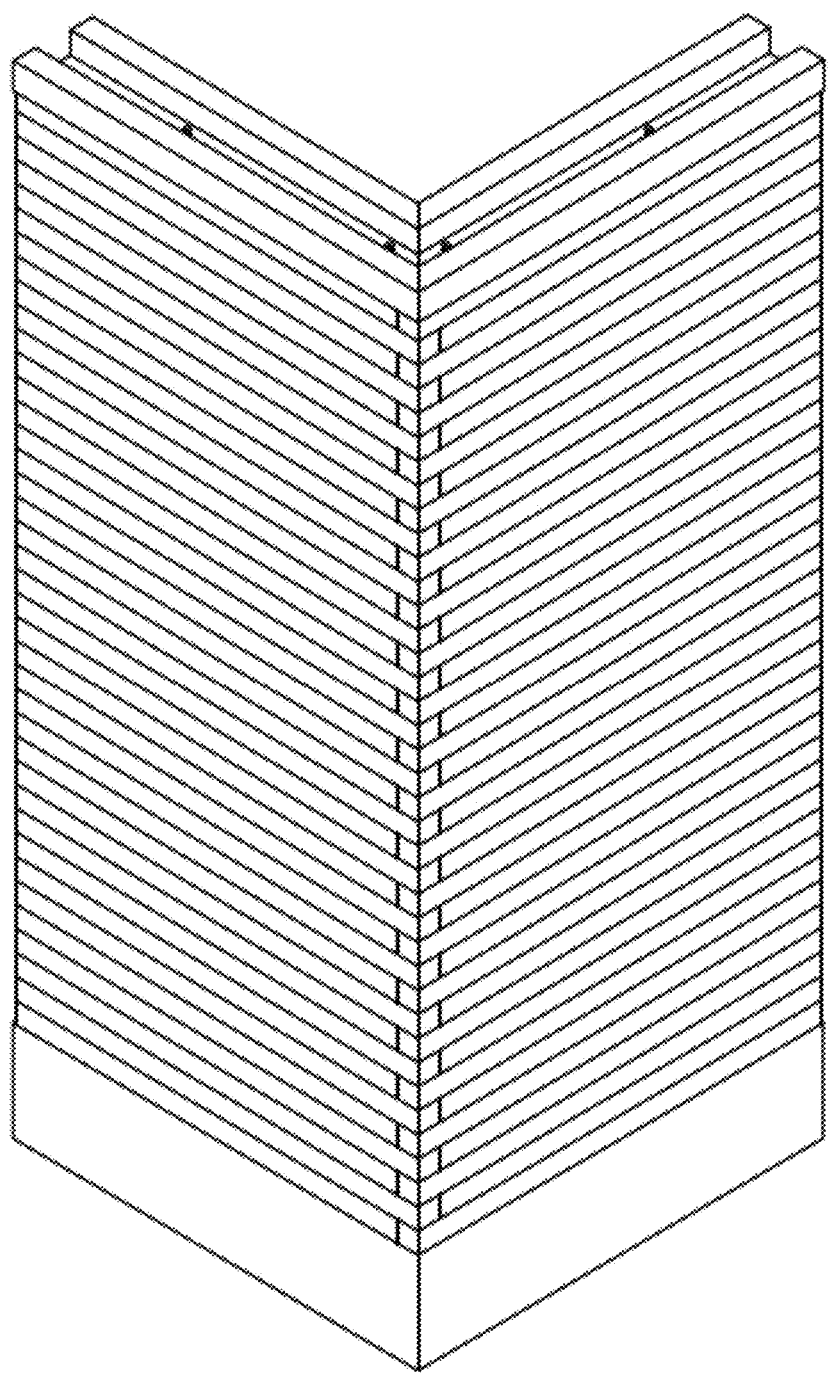
FIG. 22B shows a perspective outer view of the 90-degree corner with "layered weave," or alternating layer patterns of concrete wythe layers, in some embodiments.
Figure 22C:
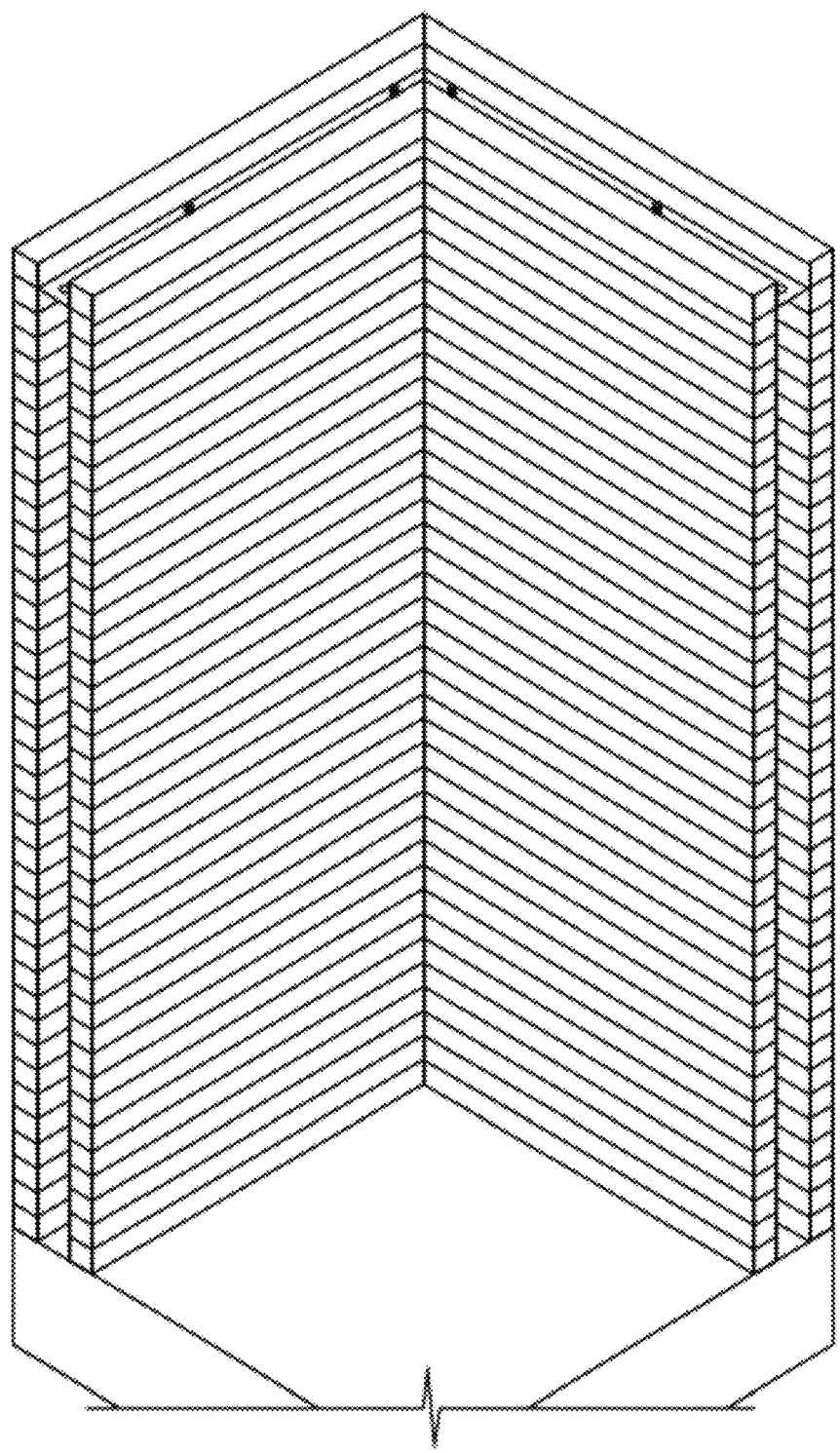
FIG. 22C shows a perspective inner view of the 90-degree corner, in some embodiments.

FIG. 22B shows a perspective outer view (2200B) of the 90-degree corner with "layered weave," or alternating layer patterns of concrete wythe layers, in some embodiments. Furthermore, FIG. 22C shows a perspective inner view (2200C) of the 90-degree corner, in some embodiments.

Various embodiments have been described above and also illustrated by FIGS. 1~22C. Embodiments described herein provide several advantages over conventional 3D printing techniques that had been experimented in construction projects. One advantage of the wall system constructed in some embodiments is its systemic incorporation of novel structures, which are optimized for a thicker and stiffer concrete mixture layering via pressurized ram extrusions, instead of a sand-based softer slurry pumping that often causes bulging layers on sidewalls, awkward wall edges and corners, and other architectural design and building limitations.

Another advantage of embodiments described herein comes from its 3D printer-printable composite wall system that behaves like a dry-stacked masonry structure, which in turn improves aesthetics, functionality, and architectural design flexibility between layers and edges, compared to existing 3D-printing construction methods. Furthermore, an additional advantage of embodiments described herein is its 3D printer-printable composite wall system with novel structures that support advantageous and unique characteristics for a 3D-printed physical wall, such as exact-length segment extrusions, precise shear-cutting of segments, interlocking extrusion pattern weaving, convenient secondary system installations in a uniquely-created interstitial wall cavity, and high thermal and acoustic isolations.

Moreover, another advantage of embodiments described herein comes from its 3D printer-printable composite wall system with novel structures that accommodate an unlimited breaktime availability between layer applications during a 3D-printing of a physical wall. In addition, another advantage of embodiments described herein is providing a novel method of constructing a 3D printer-printable wall system with novel structures that overcomes many of the disadvantages of existing 3D printer-based wall construction techniques that utilize a sand-based soft slurry.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for constructing a three-dimensional (3D) printer-printable wall system, the method comprising the steps of:
    forming a concrete foundation on a substrate, wherein the concrete foundation embeds a plurality of reinforcements;
    printing a first inner wythe horizontal layer and a first outer wythe horizontal layer using a construction material mixture from a 3D printer, wherein the first inner wythe horizontal layer and the first outer wythe horizontal layer are separated by an interstitial space;
    printing additional inner wythe horizontal layers upward on top of the first inner wythe horizontal layer to form a composite inner wythe;
    printing additional outer wythe horizontal layers upward on top of the first outer wythe horizontal layer to form a composite outer wythe;
    placing at least one wall tie between the composite inner wythe and the composite outer wythe, across the interstitial space;
    installing a sill cap on top of the composite inner wythe and the composite outer wythe; and
    inserting an anchor mechanism into the sill cap.

2. The method of claim 1 wherein the plurality of reinforcements includes a plurality of horizontal reinforcements and a plurality of vertical reinforcements.

3. The method of claim 1, further comprising a step of placing a fixity fill layer on top of the concrete foundation in the interstitial space.

4. The method of claim 1, further comprising injecting foam into the interstitial space.

5. The method of claim 1, further comprising installing a plurality of wall dams extending across the interstitial space.

6. The method of claim 5, further comprising a step of installing a lower lintel form on a first pair of horizontal layers, an upper lintel form on a second pair of horizontal layers several layers above the first pair, and a lintel reinforcement between the lower lintel form and the upper lintel form, wherein the lower lintel form, the upper lintel form, the wall dams, and a volume of concrete positioned therebetween constitute a cast-in-place (CIP) lintel and column frame.

7. A three-dimensional (3D) printer-printable wall system comprising:
    a foundation made of concrete;
    a plurality of reinforcements embedded in the foundation;
    a composite inner wythe comprising a first vertical stack of horizontal layers of construction material printed by a 3D printer;
    a composite outer wythe comprising a second vertical stack of horizontal layers of construction material also printed by the 3D printer;
    an interstitial space formed between the composite inner wythe and the composite outer wythe;
    at least one wall tie placed between the composite inner wythe and the composite outer wythe across the interstitial space;
    a sill cap positioned across the composite inner wythe and the composite outer wythe; and
    an anchor mechanism inserted into the sill cap.

8. The 3D printer-printable wall system of claim 7, wherein the plurality of reinforcements comprises horizontal reinforcements oriented across the foundation and vertical reinforcements oriented along the first vertical stack of horizontal layers and the second vertical stack of horizontal layers.

9. The 3D printer-printable wall system of claim 7, further comprising a plurality of wall dams positioned between the composite inner wythe and the composite outer wythe across the interstitial space in at least one horizontal layer segment.

10. The 3D printer-printable wall system of claim 7, further comprising an attachment bracket for utility lines positioned between the composite inner wythe and the composite outer wythe within the interstitial space.

11. The 3D printer-printable wall system of claim 7, wherein the sill cap sill cap comprises a first curb to encapsulate a top portion of the composite inner wythe, a second curb to encapsulate a top portion of the composite outer wythe, and a central trough positioned between the first curb and the second curb.

12. The 3D printer-printable wall system of claim 7, further comprising a fixity fill layer on top of the foundation in the interstitial space.

13. The 3D printer-printable wall system of claim 7, further comprising a lower lintel form on a first pair of horizontal layers, an upper lintel form on a second pair of horizontal layers several layers above the first pair, and a lintel reinforcement between the lower lintel form and the upper lintel form, wherein the lower lintel form, the upper lintel form, the wall dams, and a volume of concrete positioned therebetween constitute a cast-in-place (CIP) lintel and column frame.

14. The 3D printer-printable wall system of claim 13, further comprising a window or a door installed in an opening created by cutting an area of the composite inner wythe and the composite outer wythe defined by the CIP lintel and column frame.

15. The 3D printer-printable wall system of claim 7, further comprising foam positioned within the interstitial space.

16. The 3D printer-printable wall system of claim 7, wherein segments of the composite inner wythe and the composite outer wythe terminate in a layered weave pattern, which comprises a first concrete wythe layer pattern, followed by a second concrete wythe layer pattern on top of the first concrete wythe pattern.

17. The 3D printer-printable wall system of claim 7, wherein the wall tie is positioned to hold the composite inner wythe and the composite outer wythe rigidly while maintaining the dimensions of the interstitial space.

18. The 3D printer-printable wall system of claim 7, wherein construction processes for the 3D printer-printable wall system utilize an automated secondary gantry, in addition to the 3D printer.

19. The 3D printer-printable wall system of claim 7, wherein the sill cap incorporates an integrated truss bracket to attach a roof truss.

* * * * *